(12) United States Patent
Van Heugten et al.

(10) Patent No.: US 12,521,949 B2
(45) Date of Patent: Jan. 13, 2026

(54) THREE-DIMENSIONAL (3D) PRINTING OF ELECTRO-ACTIVE LENSES

(71) Applicant: e-Vision Smart Optics, Inc., Sarasota, FL (US)

(72) Inventors: Anthony Van Heugten, Sarasota, FL (US); Joel D. Zychick, Bethpage, NY (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 586 days.

(21) Appl. No.: 17/845,024

(22) Filed: Jun. 21, 2022

(65) Prior Publication Data

US 2022/0324188 A1 Oct. 13, 2022

Related U.S. Application Data

(62) Division of application No. 16/348,221, filed as application No. PCT/US2019/012969 on Jan. 10, 2019, now Pat. No. 11,370,185.

(Continued)

(51) Int. Cl.
*B29D 11/00* (2006.01)
*B29C 64/112* (2017.01)
(Continued)

(52) U.S. Cl.
CPC ...... *B29D 11/00817* (2013.01); *B29C 64/112* (2017.08); *B33Y 10/00* (2014.12);
(Continued)

(58) Field of Classification Search
CPC . B29D 11/00817; B29C 64/112; B33Y 10/00; B33Y 40/20; B33Y 80/00; G02C 7/083; G02C 7/101
See application file for complete search history.

(56) References Cited

U.S. PATENT DOCUMENTS 8,778,022 B2 7/2014 Blum et al.
8,840,235 B2 9/2014 Blessing
(Continued)

FOREIGN PATENT DOCUMENTS

EP 2392473 A1 12/2011
EP 2396682 A1 12/2011
(Continued)

OTHER PUBLICATIONS

Israeli Office Action (NOA) for Israeli App. No. 275971 dated Jul. 25, 2024, 2 pages.
(Continued)

*Primary Examiner* — Mathieu D Vargot
(74) *Attorney, Agent, or Firm* — Smith Baluch LLP

(57) ABSTRACT

A method of manufacturing an optic includes disposing electronic circuitry on a substrate. The method also includes depositing a first resin on the first side of the electronic circuitry and curing the first resin to form a first optical segment. The method further includes depositing a second resin on the second side of the electronic circuitry and curing the second resin to form a second optical segment. The first and second optical segments encapsulate the electronic circuitry. The first resin and the second resin can include multiple droplets of resin, thereby reducing mechanical force imposed on the electronic circuitry during printing and allowing conformal contact between the resin and the electronic circuitry. Accordingly, electronic circuitry of smaller dimension can be used to form the electronic eyewear.

17 Claims, 17 Drawing Sheets

Related U.S. Application Data

(60) Provisional application No. 62/616,219, filed on Jan. 11, 2018.

(51) Int. Cl.
| | | |
|---|---|---|
| *B33Y 10/00* | (2015.01) | |
| *B33Y 40/20* | (2020.01) | |
| *B33Y 80/00* | (2015.01) | |
| *G02C 7/08* | (2006.01) | |
| *G02C 7/10* | (2006.01) | |
| *B29K 105/00* | (2006.01) | |
| *B29L 11/00* | (2006.01) | |

(52) U.S. Cl.
CPC ............ *B33Y 40/20* (2020.01); *B33Y 80/00* (2014.12); *G02C 7/083* (2013.01); *G02C 7/101* (2013.01); *B29K 2105/0079* (2013.01); *B29L 2011/0016* (2013.01)

(56) References Cited

U.S. PATENT DOCUMENTS

| | | |
|---|---|---|
| 9,122,083 B2 | 9/2015 | Blum et al. |
| 9,155,614 B2 | 10/2015 | Blum et al. |
| 9,463,597 B2 | 10/2016 | Vrie et al. |
| 9,592,690 B2 | 3/2017 | Blessing et al. |
| 9,662,837 B2 | 5/2017 | Vrie et al. |
| 9,891,346 B2 | 2/2018 | Vrie et al. |
| 11,370,185 B2 | 6/2022 | Heugten et al. |
| 2003/0165744 A1 | 9/2003 | Schubert et al. |
| 2004/0027536 A1 | 2/2004 | Blum et al. |
| 2005/0254129 A1 | 11/2005 | Clark et al. |
| 2009/0326651 A1 | 12/2009 | Spoor et al. |
| 2010/0230837 A1 | 9/2010 | Zanini et al. |
| 2011/0115101 A1 | 5/2011 | Knobloch et al. |
| 2011/0298877 A1 | 12/2011 | Blessing |
| 2012/0019936 A1 | 1/2012 | Blessing et al. |
| 2013/0133274 A1 | 5/2013 | Blessing |
| 2013/0286073 A1 | 10/2013 | Blessing et al. |
| 2014/0002788 A1 | 1/2014 | Otts et al. |
| 2014/0302782 A1 | 10/2014 | Raab et al. |
| 2015/0002789 A1 | 1/2015 | Kaihoko et al. |
| 2015/0061166 A1 | 3/2015 | Vrie et al. |
| 2015/0086754 A1 | 3/2015 | Vrie et al. |
| 2015/0093544 A1 | 4/2015 | Vrie et al. |
| 2015/0093552 A1 | 4/2015 | Biskop et al. |
| 2015/0104991 A1 | 4/2015 | Biskop et al. |
| 2016/0003977 A1 | 1/2016 | Vrie et al. |
| 2016/0039208 A1 | 2/2016 | Vrie et al. |
| 2016/0062152 A1 | 3/2016 | Fonte et al. |
| 2016/0136889 A1 | 5/2016 | Rolland et al. |
| 2016/0271869 A1 | 9/2016 | Vrie et al. |
| 2016/0311157 A1 | 10/2016 | Vrie et al. |
| 2016/0341851 A1 | 11/2016 | Blessing et al. |
| 2016/0363784 A1 | 12/2016 | Beaton et al. |
| 2018/0085993 A1 | 3/2018 | Biskop et al. |
| 2018/0162055 A1 | 6/2018 | Biskop et al. |
| 2018/0162143 A1 | 6/2018 | Biskop |
| 2018/0203260 A1 | 7/2018 | Blum |
| 2018/0272597 A1 | 9/2018 | Biskop |
| 2019/0009455 A1 | 1/2019 | Biskop |
| 2019/0009456 A1 | 1/2019 | Biskop |
| 2019/0009481 A1 | 1/2019 | Biskop |

FOREIGN PATENT DOCUMENTS

| | | | |
|---|---|---|---|
| EP | 2412767 A1 | 2/2012 | |
| EP | 2469309 A2 | 6/2012 | |
| EP | 2469309 A3 | 7/2012 | |
| EP | 2474404 A1 | 7/2012 | |
| EP | 2553504 A1 | 2/2013 | |
| EP | 2396682 B1 | 5/2013 | |
| EP | 2469309 B1 | 8/2013 | |
| EP | 2631686 A1 | 8/2013 | |
| EP | 2392473 B1 | 9/2013 | |
| EP | 2636534 A1 | 9/2013 | |
| EP | 2661345 A1 | 11/2013 | |
| EP | 2474404 B1 | 12/2014 | |
| EP | 2834059 A1 | 2/2015 | |
| EP | 2846982 A1 | 3/2015 | |
| EP | 2846983 A1 | 3/2015 | |
| EP | 2846984 A1 | 3/2015 | |
| EP | 2636534 B1 | 4/2015 | |
| EP | 2862013 A1 | 4/2015 | |
| EP | 2943331 A1 | 11/2015 | |
| EP | 2976214 A1 | 1/2016 | |
| EP | 3051843 A1 | 8/2016 | |
| EP | 3057775 A1 | 8/2016 | |
| EP | 2846984 B1 | 9/2016 | |
| EP | 3083197 A1 | 10/2016 | |
| EP | 3083212 A1 | 10/2016 | |
| EP | 3083213 A1 | 10/2016 | |
| EP | 3084499 A1 | 10/2016 | |
| EP | 3296083 A1 | 3/2018 | |
| EP | 3297808 A1 | 3/2018 | |
| EP | 2943331 B1 | 6/2018 | |
| EP | 3332947 A1 | 6/2018 | |
| EP | 3332975 A1 | 6/2018 | |
| EP | 3379324 A1 | 9/2018 | |
| EP | 2846982 B1 | 11/2018 | |
| EP | 3427935 A1 | 1/2019 | |
| EP | 3427947 A1 | 1/2019 | |
| EP | 3427948 A1 | 1/2019 | |
| WO | 2010091888 A1 | 8/2010 | |
| WO | 2011120681 A1 | 10/2011 | |
| WO | 2012093086 A1 | 7/2012 | |
| WO | 2013149891 A1 | 10/2013 | |
| WO | 2013167415 A1 | 11/2013 | |
| WO | 2013167528 A1 | 11/2013 | |
| WO | 2013167685 A1 | 11/2013 | |
| WO | 2013186298 A1 | 12/2013 | |
| WO | WO-2013188805 A2 * | 12/2013 | ............ B29D 12/02 |
| WO | 2014108364 A1 | 7/2014 | |
| WO | 2014146931 A1 | 9/2014 | |
| WO | 2015055550 A1 | 4/2015 | |
| WO | 2015092014 A1 | 6/2015 | |
| WO | 2015092015 A1 | 6/2015 | |
| WO | 2015092016 A1 | 6/2015 | |
| WO | 2015092017 A1 | 6/2015 | |
| WO | 2015144885 A1 | 10/2015 | |
| WO | 2016044547 A1 | 3/2016 | |
| WO | 2016188930 A1 | 12/2016 | |
| WO | 2017172642 A1 | 10/2017 | |
| WO | 2017212529 A1 | 12/2017 | |
| WO | 2018054641 A1 | 3/2018 | |
| WO | 2018055006 A1 | 3/2018 | |
| WO | 2018045409 A9 | 6/2018 | |
| WO | 2018108508 A1 | 6/2018 | |
| WO | 2019048501 A1 | 3/2019 | |

OTHER PUBLICATIONS

Extended European Search Report in European Patent Application No. 19739093.3 mailed Sep. 8, 2021, 10 pages.

Gaikwad et al., "Electrochemical-Mechanical Analysis of Printed Silver Electrodes in a Microfluidic Device," J. Electrochem. Soc. 158, A154-A162 (2011), 9 pages.

Ho et al., "Direct write dispenser printing of a zinc microbattery with an ionic liquid gel electrolyte," J. Micromech. Microeng., 20, 104009 (2010), 4 pages.

International Search Report and Written Opinion in International Patent Application No. PCT/US19/12969 mailed Apr. 12, 2019, 17 pages.

Sun, K. et al., "3D Printing of Interdigitated Li-Ion Microbattery Architectures," Adv. Mater., 25, 4539-43 (2013), 5 pages.

Israeli Office Action for Israeli App. No. 275971 dated Aug. 6, 2023, 4 pages.

* cited by examiner

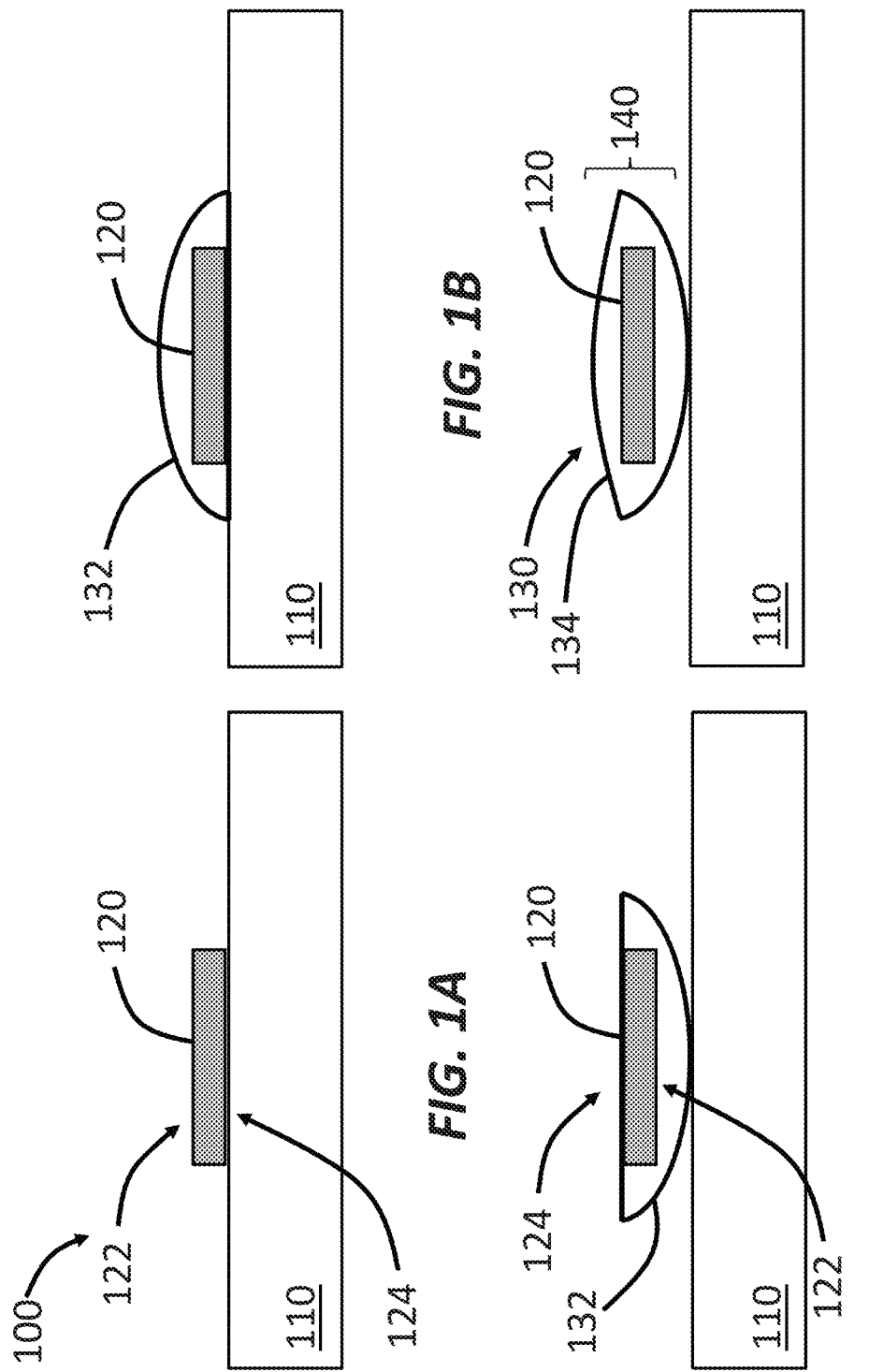

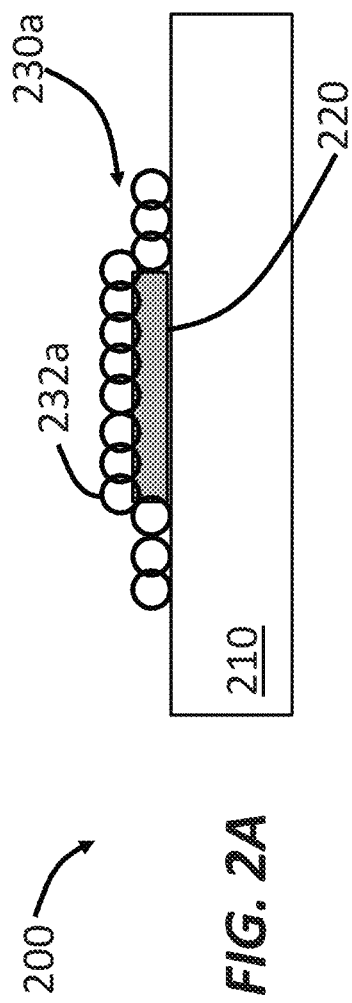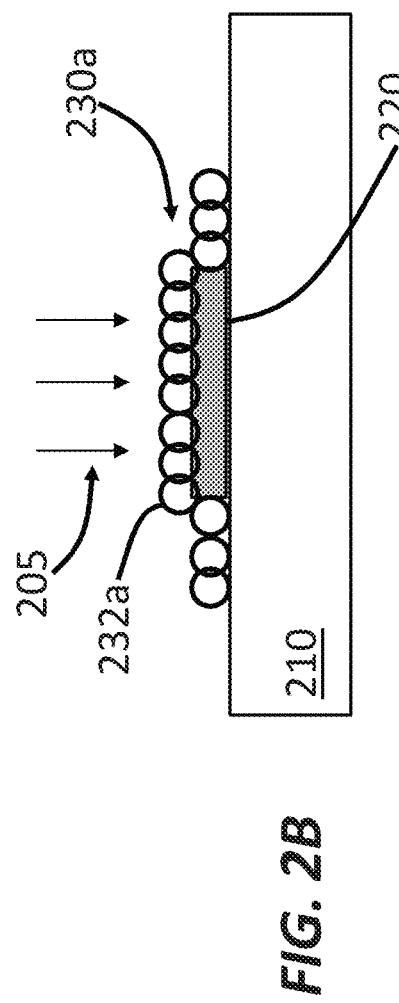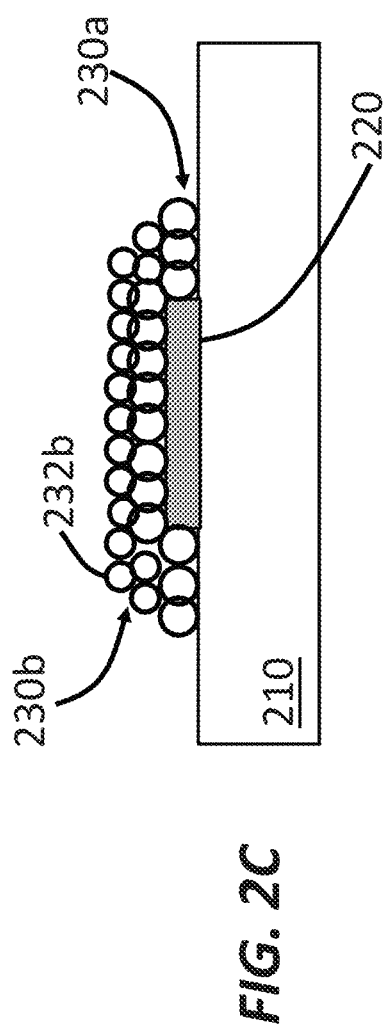

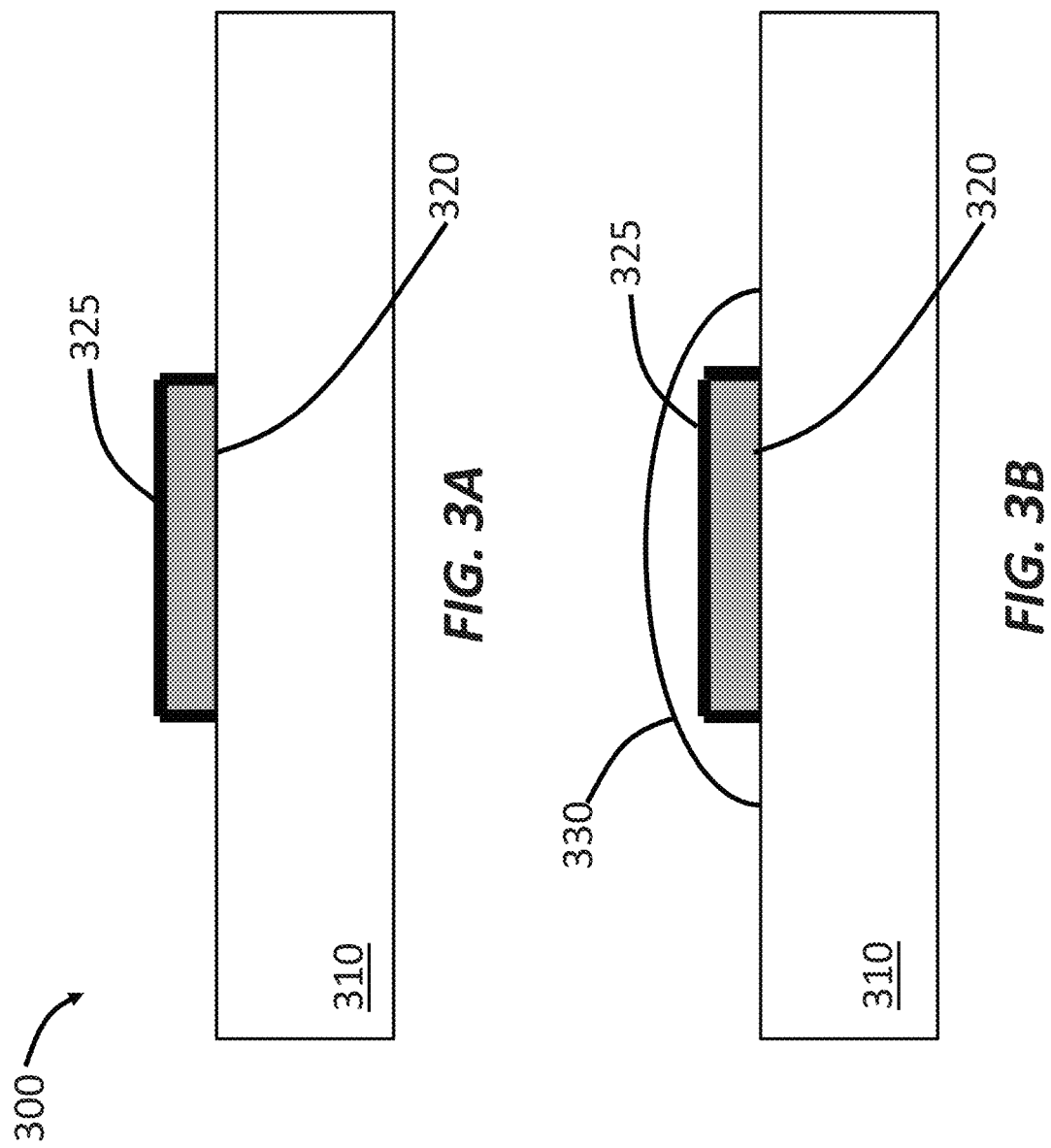

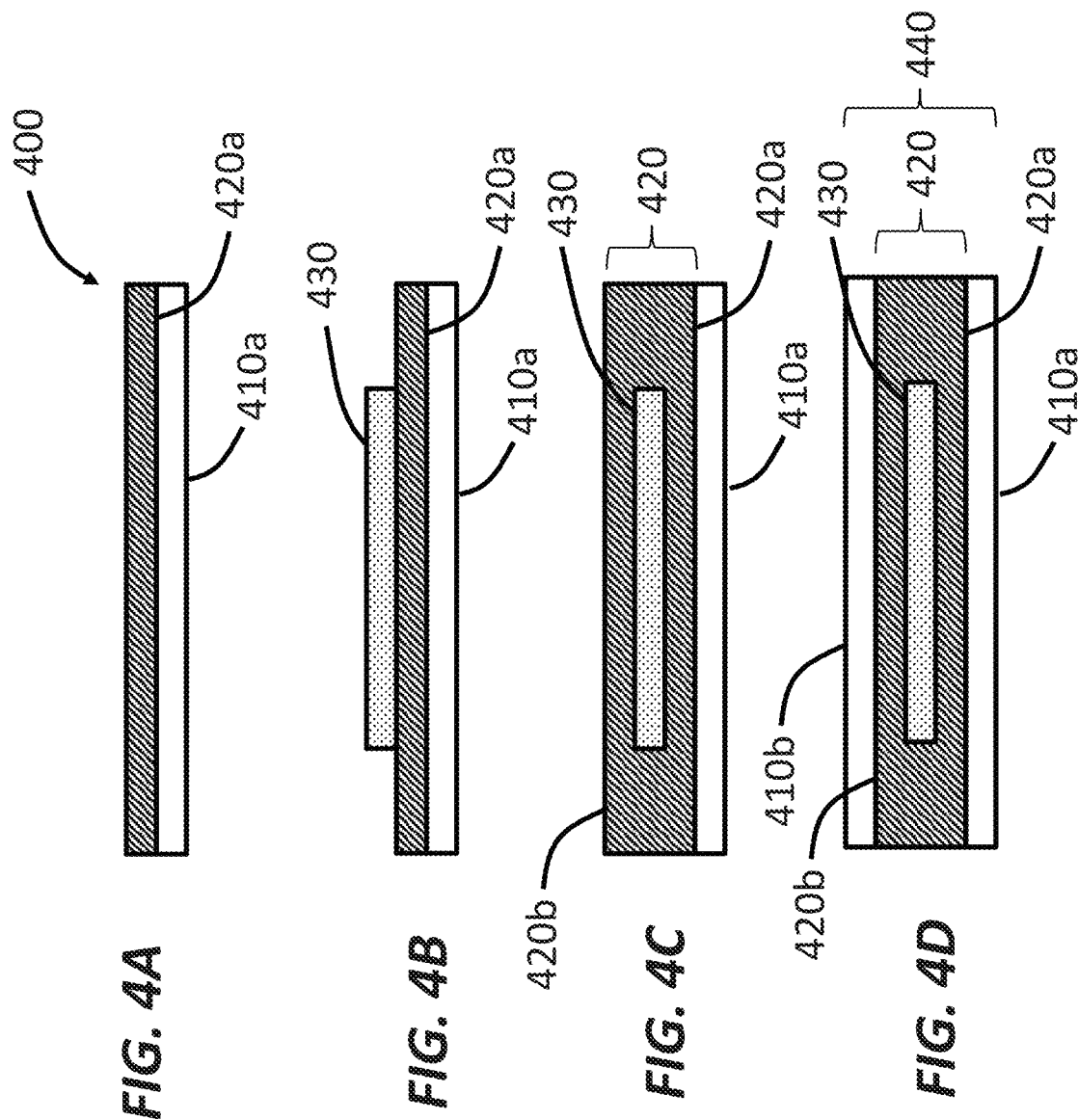

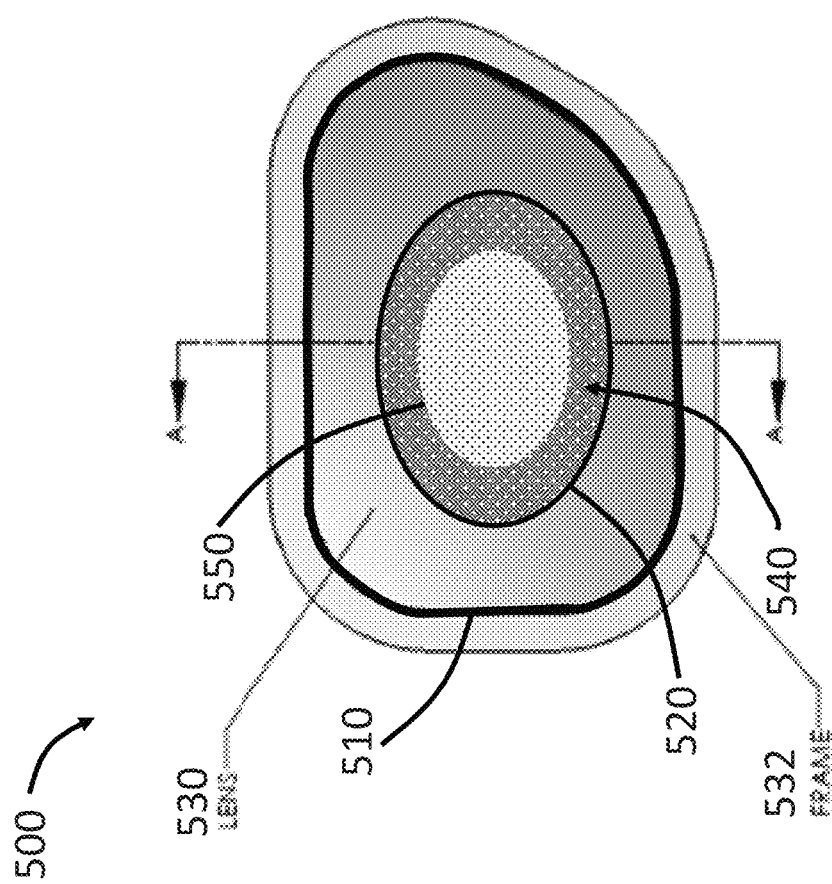

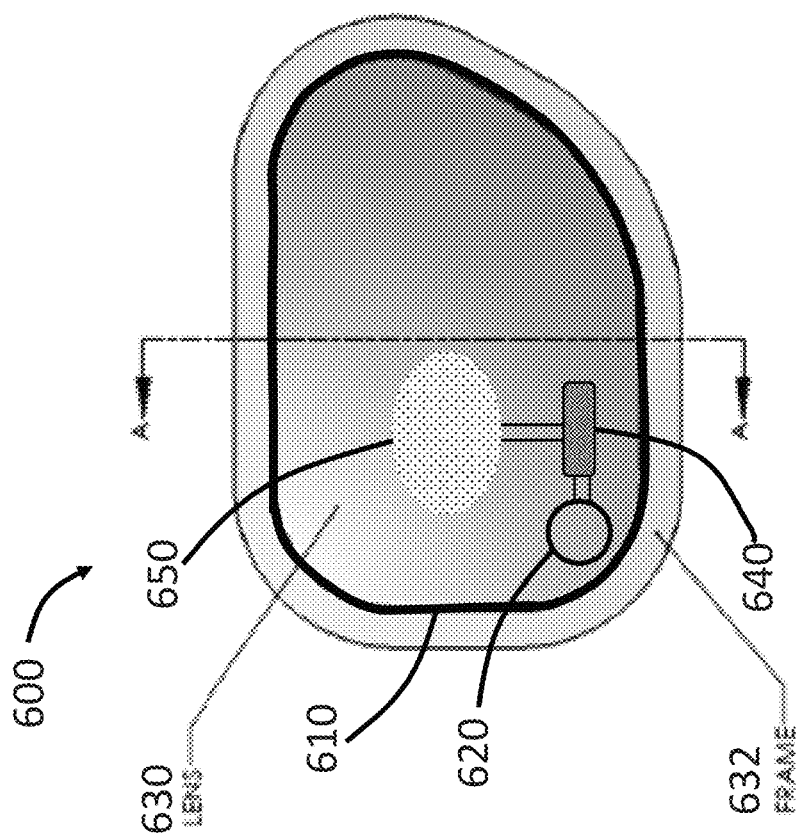
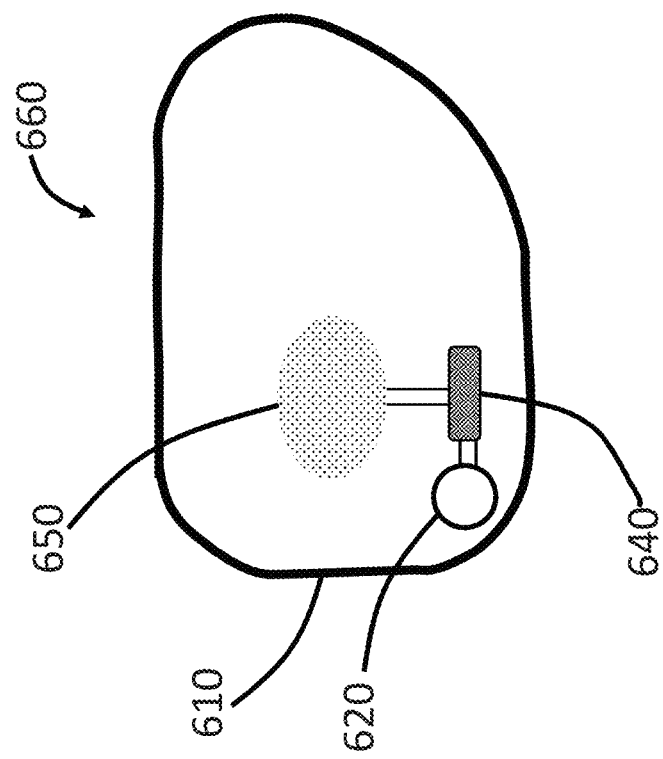
FIG. 6B
FIG. 6A

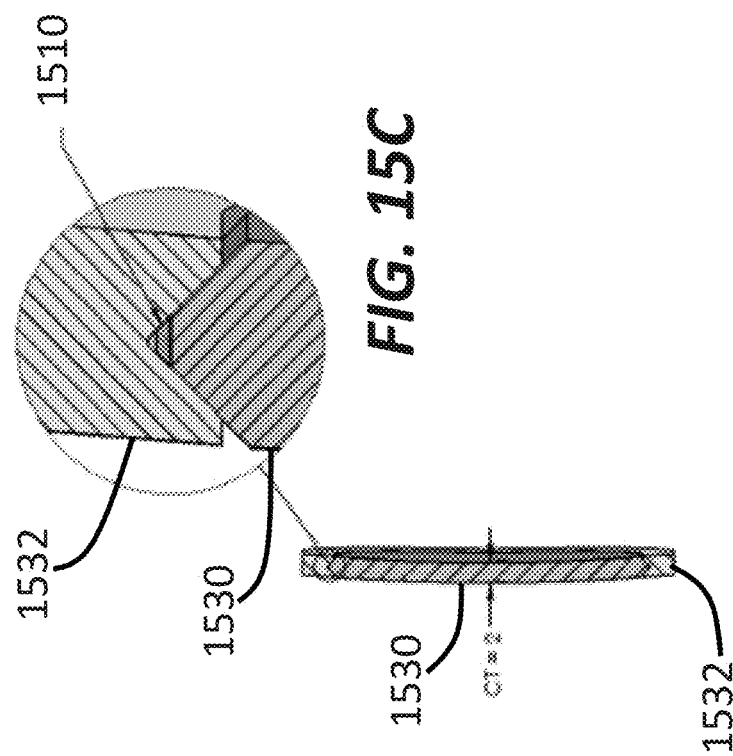
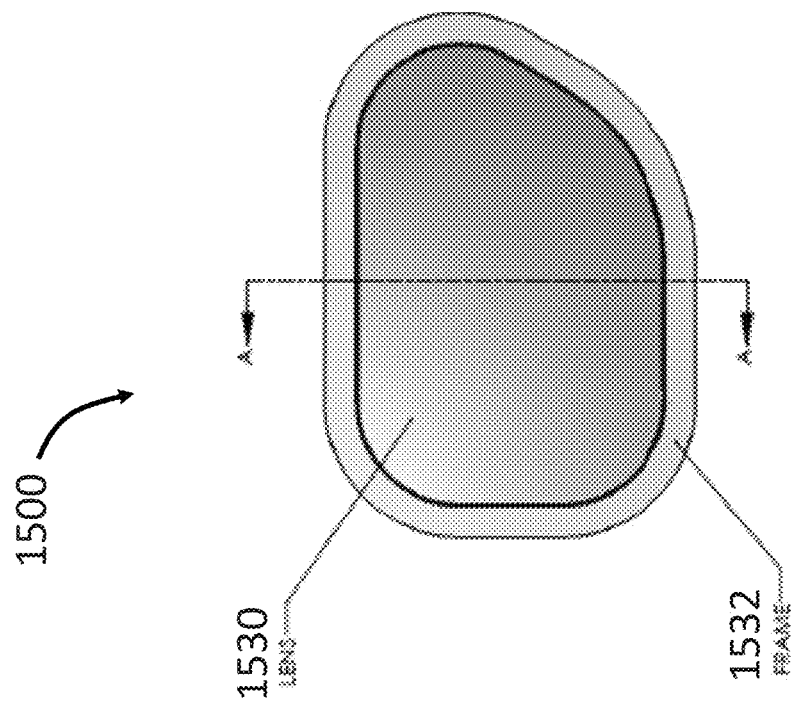
FIG. 15C
FIG. 15B
FIG. 15A

THREE-DIMENSIONAL (3D) PRINTING OF ELECTRO-ACTIVE LENSES

CROSS-REFERENCE TO RELATED APPLICATION(S)

This application is a divisional of U.S. application Ser. No. 16/348,221, now U.S. Pat. No. 11,370,185, filed on May 8, 2019, and entitled "Three-Dimensional (3D) Printing of Electro-Active Lenses," which is a national-stage application, under 35 U.S.C. 371, of International Application No. PCT/US2019/012969, filed on Jan. 10, 2019, and entitled "Three-Dimensional (3D) Printing of Electro-Active Lenses," which in turn claims the priority benefit, under 35 U.S.C. 119(e), of U.S. Application No. 62/616,219, filed on Jan. 11, 2018, and entitled, "Three-Dimensional (3D) Printing of Electro-Active Lenses." Each of these applications is incorporated herein by reference in its entirety.

BACKGROUND

Eyewear that includes functional electronics (also referred to as electronic eyewear) can provide advanced functionality to users. For example, a lens can include an electro-active material to form an electro-active lens. The electro-active material any change its refractive index or transmission in response to an electric voltage. Therefore, the electro-active lens can dynamically adjust its optical power or transmission as controlled by the user or automatically triggered by environmental conditions such as the intensity of ambient light. An electro-active lens may also include electronics in the lens to, for example, provide electrical power and signals to support the actuation of the electro-active material.

Conventionally, an electro-active lens is manufactured via a molding process, in which lens material (in liquid form) is poured or injected into a mold to form the lens. The electronics can be disposed in the mold such that the lens material, when cured or hardened, encapsulates the electronics. Unfortunately, molding electro-active lenses has several disadvantages. First, the electronics must be bulky enough to withstand the mechanical force exerted during the molding process (e.g., imposed by the lens material on the electronics). In other words, the electronics could be smaller if they didn't have to go through the molding process. Second, it can be challenging to apply the lens material conformally over the electronics during molding. In many cases, molding leaves gaps between the electronics and the optical parts of the resulting lens. The gaps can degrade the optical properties of the lens. Third, the molded lens may have to be ground, polished, machined, or otherwise finished to provide the desired prescription without breaking the embedded electronics. This means that the embedded electronics must be rugged enough to withstand finishing, which in turn implies that the embedded electronics must be large and heavy. These are just a few of the challenges associated with molding electro-active lenses.

SUMMARY

Systems, apparatus, and methods described herein are directed to manufacturing of electronic eyewear via three-dimensional (3D) printing technique. In one example, a method of manufacturing an optic includes disposing electronic circuitry on a substrate and the electronic circuitry has a first side and a second side opposite the first side. The method also includes depositing a first resin on the first side of the electronic circuitry and curing the first resin to form a first optical segment. The method further includes depositing a second resin on the second side of the electronic circuitry and curing the second resin to form a second optical segment. The first and second optical segments encapsulate the electronic circuitry.

In another example, a method of forming an electro-active ophthalmic lens includes depositing a first plurality of transparent resin droplets on a surface and curing the first plurality of transparent resin droplets to form a first portion of the electro-active ophthalmic lens. The first portion of the ophthalmic lens having an upward-facing surface. The method also includes disposing an electro-active element on the upward-facing surface of the first portion of the electro-active ophthalmic lens and the electro-active element has at least one of a variable transmittance or a variable optical power. The method also includes depositing a second plurality of transparent resin droplets on the electro-active element and on an exposed portion of the upward-facing surface of the first portion of the electro-active ophthalmic lens. The method further includes curing the second plurality of transparent resin droplets to form a second portion of the electro-active ophthalmic lens. The second portion of the electro-active ophthalmic lens has a radius of curvature selected to provide a predetermined optical power and forms, with the first portion of the electro-active ophthalmic lens, a hermetic seal about the electro-active element.

In yet another example, a method of three-dimensional (3D) printing includes printing a first layer of resin on a first side of electronic circuitry that has a second side opposite the first side and curing the first layer of resin to form at least a portion of a first optical segment. The method also includes printing a second layer of resin on the second side of the electronic circuitry curing the second layer of resin to form at least a portion of a second optical segment. The first optical segment, the second optical segment, and the electronic circuitry form electronic eyewear.

In yet another example, an apparatus includes electronic circuitry that includes an electro-active element. The electro-active element includes a first layer, an electro-active material disposed on the first layer, and a second layer disposed on the electro-active material. The first layer and the second layer substantially sealing the electro-active material without any adhesive. The apparatus also includes an optical element printed on the electronic circuitry and substantially enclosing the electronic circuitry. The optical element being in conformal contact with the electronic circuitry.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 1A-1D illustrate a method of manufacturing an electronic or electro-active lens using a three-dimensional (3D) printing technique.

FIGS. 2A-2C illustrate a method of 3D printing an electro-active lens by depositing droplets of a lens material (resin) to form optical components encapsulating electronics and other components.

FIGS. 3A and 3B illustrate a method of 3D printing an electronic or electro-active lens including an ultraviolet (UV) protective layer to protect the encapsulated electronics from UV radiation during UV curing of the 3D printed lens material.

FIGS. 4A-4D illustrate a method of 3D printing an electronic or electro-active element that can be embedded or formed in an electro-active lens.

FIG. 5 shows a schematic of an electro-active lens including a thin film battery fabricated by 3D printing.

FIG. 6A shows a schematic of electronic circuitry that can be embedded in an electro-active lens via 3D printing.

FIG. 6B shows a schematic of an electro-active lens including the electronic circuitry shown in FIG. 6A.

FIGS. 15A-15D illustrate a 3D printed ophthalmic lens including a repeater coil and a battery disposed between a lens and a lens frame.

DETAILED DESCRIPTION

Making Electro-Active Lenses with 3D Printing

Figure 2D:
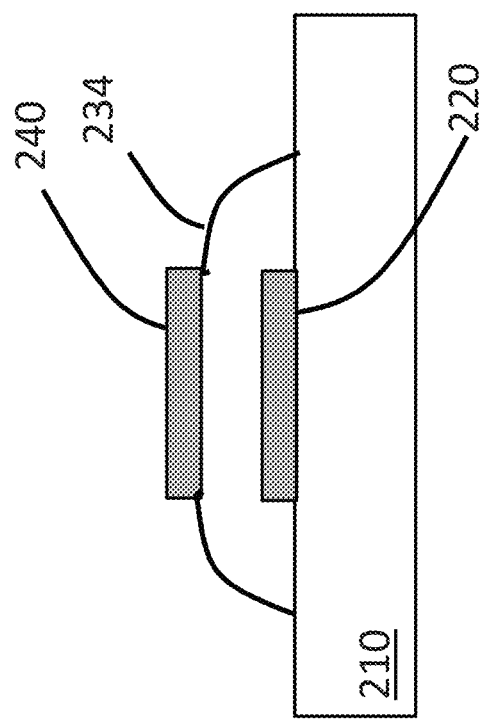
FIGS. 2D and 2E illustrate optional extra steps in the method of FIG. 2A-2C for adding components in different layers of a 3D-printed electronic or electro-active lens.

To address the challenges of making electro-active lenses with conventional molding techniques, systems, apparatus, and methods described herein employ three-dimensional (3D) printing techniques. In some of these techniques, droplets of lens material (resin) are disposed on one or both sides of one or more electronic components to form an electronic lens. Since each droplet can be small (e.g., on the order of microns), each droplet exerts negligible mechanical force on the electronics. Therefore, electronics used in this technique can be thinner and more delicate than those used in conventional electronic eyewear. In addition, the small dimensions of the droplets also allow conformal contact between the electronics and the droplets (and accordingly the optical parts of the resulting lens). This conformal contact can reduce or eliminate gaps in the lens, thereby improving the optical quality of the lens. And the droplets can be deposited in almost arbitrary shapes, so they can be used to make custom surfaces for prescription lenses that don't need to be ground or finished.

FIGS. 1A-1D illustrate a method 100 of manufacturing an electro-active lens using a 3D printing technique. In this method 100, electronic circuitry 120 is disposed on a substrate 110 as shown in FIG. 1A. The electronic circuitry 120 has a first side 122 and a second side 124 opposite the first side 122. In FIG. 1B, a first optical segment 132 is formed on the first side 122 of the electronic circuitry 120. The formation of the first optical segment 132 can be achieved by disposing resin onto the first side 122 of the electronic circuitry 120 in a layer-by-layer manner (see, e.g., FIGS. 2A-2C below). Each of these layers is very thin (e.g., with thicknesses on the order of microns), but in aggregate, they can form a thicker optical segment 132 (e.g., with a thickness on the order of millimeters or centimeters). The layers are cured, e.g., layer-by-layer with heat or UV light, to form the first optical segment 132.

In FIG. 1C, the first optical segment 132 is cured and the electronic circuitry 120 is turned upside down, exposing the second side 124 for further processing. In FIG. 1D, a second optical segment 134 is formed on the second side 124 of the electronic circuitry 120 in a layer-by-layer fashion just like the first optical segment 132. Once cured, the first optical segment 132 and the second optical segment 134 substantially encapsulate the electronic circuitry 120 and form an optical component 130 (e.g., a lens, prism, Fresnel lens, or other bulk optical component). Together, the optical component 130 and the electronic circuitry 120 form an electro-active lens 140.

The substrate 110 in the method 100 can include any substrate that can support the processing of the electronic circuitry 120 via 3D printing. If desired, the substrate 110 can include or be coated with a non-stick material such that the assembly of the first optical segment 132 and the electronic circuitry 120 can be readily turned upside down for further processing (shown in FIG. 1C). For example, the substrate 110 can include silicone, polydimethylsiloxane (PDMS), polytetrafluoroethylene (PTFE), ceramic, or any other non-stick material. In another example, the substrate 110 can include a rigid material coated with a non-stick material on the surface. For example, the rigid material can include plastic, metal, or glass. If desired, a portion of the substrate 110 may be patterned or indented to hold the first optical segment 130 when it is flipped upside down as in FIGS. 1C and 1D.

The substrate 110 can also have a dimple or depression for molding half of the bulk optic portion of the lens. Resin or other polymer may be deposited in the depression and cured to form a concave or convex surface facing down and a planar surface facing up. The electronic circuitry 120 can be placed on the planar surface and the remaining portion of the bulk optic portion of the lens can be deposited as described above with respect to FIG. 1B on the electronic circuitry 120 to fully or partially encapsulate the electronic circuity 120. If desired, some resin can be deposited and cured on the planar surface to form a receptacle for the electronic circuity 120 before deposition and curing of the resin on top of the electronic circuitry 120. Once this resin has been cured, the completed lens can be released from the depression in the substrate.

The electronic circuitry 120 can include various electronic and/or electro-active components. For example, the electronic circuitry 120 can include an electro-active element, such as a liquid crystal element or electro-chromic element, which can change its optical properties (e.g., refractive index or transmittance) in response to an applied voltage. The electronic circuitry 120 can also include electronic components, such as a power supply (e.g., a thin-film battery or capacitor), antenna or inductive loop (e.g., for wireless communication and/or wireless charging), interconnect, processor, or controller. More details of the electronic circuitry 120 are described below with reference to FIGS. 5-7.

As described above, the 3D printing technique allows the use of very thin electronic circuitry 120 that likely wouldn't withstand the mechanical forces exerted in a conventional molding process. For example, the thickness of the electronic circuitry 120 can be substantially equal to or less than 10 μm (e.g., about 10 μm, about 9 μm, about 8 μm, about 7 μm, about 6 μm, about 5 μm, or less, including any values and sub ranges in between).

In some cases, at least part of the electronic circuitry 120 can also be fabricated via 3D printing. For example, interconnects and conductive traces can be printed using conductive resin (or any other conductive ink). In this example, non-printed parts can be disposed on the substrate 110 and the connections between them can be printed to form the electronic circuitry 120, after which the first optical segment 132 can be formed. In another example, the power supply in the electronic circuitry 120 can also be printed. More details on printing a power supply, interconnect, and/or other portions of the electronic circuitry 120 can be found below with reference to FIG. 7.

If desired, the first optical segment 132 can be a portion of a first optical device and the second optical segment 132 can be a portion of another optical device. For example, the first optical segment 132 can be part of a convex lens and the second optical segment 134 can be part of a concave lens. In another example, the first optical segment 132 can include a flat surface and the second optical segment 132 can include a convex surface, i.e., the optical component 130 may form or include a plano-convex lens. In yet another example, the first optical segment 132 can include a flat surface and the second optical segment 132 can include a concave surface, i.e., the optical component 130 may form or include a plano-concave lens.

In yet another example, the first optical segment 132 can include a convex surface having a first radius of curvature or surface shape and the second optical segment 132 can include a convex surface having a second radius of curvature or surface shape different from the first radius of curvature or surface shape. In yet another example, the first optical segment 132 can include a concave surface having a first radius of curvature or surface shape and the second optical segment 132 can include a concave surface having a second radius of curvature or surface shape different from the first radius of curvature or surface shape. Any other combination of the first optical segment 132 and the second optical segment 134 can also be used to produce an aspherical surface, a surface with cylindrical power (e.g., to correct for astigmatism), or an arbitrarily shaped surface.

The resulting electro-active lens 140 (shown in FIG. 1D) can be configured for various applications. In one example, the electro-active lens 140 can be used in prescription spectacle lenses if it provides static and/or variable optical power. In another example, the eyewear 140 can be used in sunglasses if the electronic circuitry 120 includes an electro-active element, such as an electro-chromic element, that changes its transmittance in response to an applied voltage. In yet another example, the electro-active lens 140 can be used in a heads-up display (HUD). In this case, the electronic circuitry 120 can include a liquid-crystal display for virtual reality (VR), mixed reality (MR), and/or augmented reality (AR) applications. In yet another example, the electro-active lens 140 can be used in or as a contract lens or intra-ocular optic, such as an intra-ocular lens. In this example, the lens material can include silicone or another biocompatible, curable lens material.

Dropwise 3D Printing for Making Electro-Active Lenses

FIGS. 2A-2C illustrate a method 200 of 3D printing of an electronic or electro-active lens by depositing droplets of lens material, such as a UV-curable resin, on and around one or more electronic components. In the method 200, a first layer 230a of droplets 232a is disposed on component 220, such as electronic circuitry or a liquid crystal element with variable refractive index, that is disposed on a substrate 210, as shown in FIG. 2A. The first layer 230a includes multiple droplets 232a (e.g., resin droplets) in conformal contact with the component 220. Adjacent droplets 232a can partially overlap each other or bleed into each other while viscous so as to substantially enclose the component 220, thereby preventing the formation of gaps that could degrade the lens's optical and structural integrity.

The droplets 232a can be disposed on the component 220 using a nozzle connected to a tank including the lens material (e.g., an inkjet printer). The lens material is squeezed out of the nozzle using a piezoelectric actuator to form the droplets 232a. The nozzle moves relative to the component 220, e.g., with a translation stage that moves the nozzle or the substrate supporting the component 220. A computer or other controller actuates this stage and the droplet deposition by the nozzle such that the nozzle deposits drops in a desired pattern and order.

The diameter of the droplets 232a can depend on the diameter of the nozzle and the amount of lens material upon each actuation of the actuator. For example, the diameter of the droplets can be substantially equal to or less than 100 μm (e.g., about 100 μm, about 90 μm, about 80 μm, about 70 μm, about 60 μm, about 50 μm, about 40 μm, about 30 μm, or less, including any values and sub ranges in between). If desired, the nozzle may be actuated to produce droplets of different sizes (e.g., larger in the middle of the electronic circuity and smaller around the edges) to produce a solid surface with a predetermined curvature once the droplets have been cured.

In FIG. 2B, electromagnetic radiation 205 cures the droplets 232a. In one example, the electromagnetic radiation 205 can be ultraviolet (UV) radiation, which can have a wavelength from about 10 nm to about 400 nm. The UV radiation can be emitted by, for example, a light-emitting diode (LED), a xenon lamp, a quartz tungsten halogen lamp, or any other appropriate UV light source. In another example, the electromagnetic radiation 205 can be infrared (IR) radiation, which can have a wavelength from about 700 nm to about 1 mm. The IR radiation can heat the droplets 232a and cure the droplets 232a via this heating. Alternatively, a heater can be used to heat and cure the droplets 232a. The curing temperature can be substantially equal to or less than 80° C. (e.g., about 80° C., about 75° C., about 70° C., about 65° C., about 60° C., about 55° C., about 50° C., or less, including any values and sub ranges in between).

In one example, the droplets 232a can be cured after the entire layer 230a is disposed on the component 220. In another example, each droplet 232a can be cured immediately after the droplet 232a is disposed on the component 220. In this example, focusing optics can be used to focus the electromagnetic radiation 205 onto the individual droplets 232a to be cured. The curing time can be substantially equal to or less than 1 second for each droplet 232a (e.g., about 1 second, about 500 ms, about 300 ms, about 200 ms, about 100 ms, about 50 ms, or less, including any values and sub ranges in between). Each droplet can be cured before the nozzle disposes the next droplet. Or the curing process and the disposition of the droplets 232a can be performed simultaneously or nearly simultaneously.

In yet another example, the droplets 232a can be cured after a sub-group in the first layer 230a is formed. For example, the droplets 232a can be cured after the surface of the first substrate 210 is covered with the droplets 232a. Similarly, the droplets 232a can be cured after the surface of the component 220 is covered with the droplets 232a. Or the droplets 232a can be cured after the contact region between the first substrate 210 and the component 220 is covered with the droplets 232a.

In some examples, all the droplets 232a in the first layer 230a have the same size. In another example, droplets 232a in the first layer 230a can have different sizes. For example, droplets 232a covering flat surfaces can have a larger diameter than droplets 232a covering uneven surfaces. In FIG. 2A, droplets 232a that cover the region right above the surface of the first substrate 210 can have a first diameter, and droplets 232a that cover the transition region from the first substrate 210 to the component 220 can have a second diameter less than the first diameter to ensure conformal contact with the edges and sidewalls of the electronics 220.

In FIG. 2C, a second layer 230b of droplets 232b is disposed on the first layer 230a. The electromagnetic radiation 205 can be applied again to cure the droplets 232b before a third layer of droplets (not shown) is applied. The process can continue until an optical segment of a desired size and shape is formed by these multiple layers of droplets. The optical segment can be, for example, substantially similar to the first optical segment 132 shown in FIGS. 1A-1D. Similar steps can also be used to form the second optical segment and accordingly the entire optical component that encapsulates the component 220. In one example, the droplets 232a and 232b have the same size. In another example, the droplets 232b can be smaller than the droplets 232a.

Figure 2E:
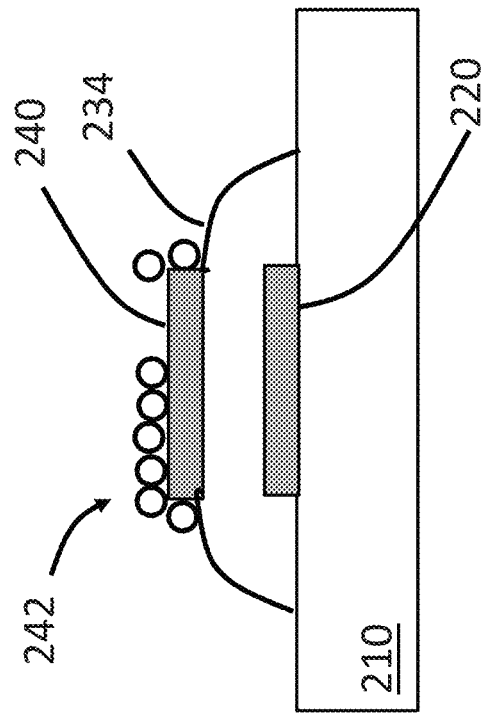

FIGS. 2D and 2E illustrate optional additional steps for adding more components to the lens at different positions along the lens's optical axis (normal to the substrate 110). The droplets 232a and 232b in FIG. 2C are cured or allowed to harden enough to form a supportive resin 234. As shown in FIG. 2D, a second electronic or electro-active component 240, such as an electrochromic or liquid crystal element with variable transmissivity, is placed on this resin 234, possibly in alignment with the component 220 already partially encapsulated within the resin 234. Then a nozzle (not shown) deposits additional droplets 242 on the second component 240 and the resin 232 as shown in FIG. 2E. These droplets 242 are cured or allowed to harden, thereby encapsulating the second component 240.

The steps shown in FIGS. 2D and 2E can be repeated as desired to form an electronic or electro-active lens with two, three, or more layers of components. The components can be stacked on top of each other, as shown in FIGS. 2D and 2E, or partially or fully offset laterally from each other. If they are stacked on top of each other or appear to at least partially overlap when looking through the lens, they may be used to produce a combined effect. For example, if the components are orthogonally oriented cylindrical liquid crystal lens elements, they can focus light in orthogonal dimensions by different amounts. If the components are orthogonally oriented prismatic liquid crystal elements, they can steer light in orthogonal dimensions. And if the components are spherical liquid crystal lens elements, they can provide additive focusing power. If one element is an electrochromic element with variable transmissivity and the other element is a liquid crystal element with a variable refractive index, the elements can be used together to selectively attenuate and/or steer or focus incident light.

More details on 3D printing can be found in International Application Publication No. WO 2016/044547 A1, filed Sep. 17, 2015, and entitled "3d printing method utilizing a photocurable silicone composition," which is hereby incorporated by reference in its entirety.

UV Protective Layers for Embedded Electronics

FIGS. 3A and 3B illustrate a method 300 of 3D printing an electro-active lens with an embedded protective layer 325 to protect electronic circuitry 320, which may include an electro-active element, from UV radiation used to cure the 3D printed lens material (resin). In FIG. 3A, a protective layer 325 is disposed on electronic circuitry 320 that is placed on a substrate 310. In FIG. 3B, an optical segment 330 is formed on the protective layer 325 and substantially encloses the electronic circuitry 320. In one example, the protective layer 325 is in conformal contact with the electronic circuitry 320 and may be deposited on the electronic circuitry 320 using 3D printing or any other suitable technique. In another example, the protective layer 325 substantially covers the top surface of the electronic circuitry 320.

The protective layer 325 is opaque to the UV radiation (e.g., radiation 205 shown in FIG. 2A-2C) employed to cure the optical segment 330 and therefore can protect the electronic circuitry 320 from potential damage caused by the UV radiation during curing. At the same time, the protective layer 325 transmits visible light, so it shouldn't affect the operation of the finished electro-active lens.

After the formation of the optical segment 330, the assembly of the optical segment 330, the electronic circuitry 320, and the protective layer 325 can be turned upside down, exposing the bottom surface of the electronic circuitry 320 for further processing. Another protective layer can be disposed on the exposed surface of the electronic circuitry 320, and another optical segment can be formed on the electronic circuitry 320 (e.g., similar to the processes shown in FIGS. 1C and 1D).

In some cases, the protective layer 325 can be disposed on the electronic circuitry 320 via 3D printing and the ink can be cured thermally. Alternatively, the electronic circuitry 320 can be disposed within the protective layer 325 before being placed on the substrate 310. For example, the electronic circuitry 320 can be vacuum packaged in a container (e.g., plastic bag) and then disposed on the substrate 310 for further processing.

Manufacturing Electro-Active Elements

FIGS. 4A-4D illustrate a method 400 of manufacturing an electro-active element 440 via 3D printing. The method 400 can be carried as a sub process for making part or all of the electronic circuitry in the methods 100, 200, and 300 described above. In FIG. 4A, a first layer 420a is printed on a first electrode 410a, which itself may be printed. For example, the first layer 420a can include multiple droplets that collectively form a thin film that covers the first electrode 410a. These droplets may be arranged and cured so that the first layer 420a includes ridges or other features that align the electro-active material 430. The droplets may also be arranged and cured so that the first layer 420a includes ridges in diffractive or refractive structures, such as facets of a spherical or cylindrical Fresnel lens.

In FIG. 4B, an electro-active material 430 is disposed on the first layer 420a. The electro-active material 430 can include liquid crystal material whose refractive index changes in response to an applied voltage or electro-chromic material whose transmissivity varies in response to an applied voltage. Changing the refractive index in the electro-active material 430 can change the total optical power or transmissivity of the lens, thereby allowing dynamic adjustment of the optical power or transmissivity by the wearer. More information about electro-active elements can be found in U.S. Pat. No. 8,778,022 B2 and in U.S. Pat. No. 9,155,614 B2, each of which is hereby incorporated by reference in its entirety.

In one example, the liquid crystal can be sprayed onto the first layer 420a. In this process, multiple droplets of liquid crystal may be disposed on the first layer 420a concurrently. In another example, the liquid crystal can be printed onto the first layer 420a. In this process, the liquid crystal can be disposed on the first layer 420a droplet by droplet. The liquid crystal can include bi-stable liquid crystal, which can maintain its orientation (and optical properties, including refractive index and transmissivity) after removal of the applied voltage, thereby reducing power consumption during use.

In FIG. 4C, a second layer 420b is printed on the electro-active material 430. The first layer 420a and the second layer 420b form a housing 420 that substantially encapsulates the electro-active material 430. Since both the first layer 420a and the second layer 420b are printed, the resulting housing 420 can be formed without using any adhesive. In FIG. 4D, a second electrode 410b is disposed on the second layer 420b. The first electrode 410a and the second electrode 410b can be configured to apply a voltage on the electro-active material 430 to adjust, for example, the refractive index and/or transmittance of the electro-active material 430. The electro-active element 440 can be included in any of the electronic circuitry (e.g., 120, 220, or 320) described herein to be part of an electronic eyewear.

The electrodes 410a and 410b can be fabricated before fabricating the rest of the electro-active element 440, for example, via 3D printing using a conductive resin. The conductive resin can be prepared by adding carbon black filler (e.g., Ketjen black) to a standard resin (e.g., epoxy or polyurethane resins). In another example, the filler can be synthetic graphite powder. In yet another example, the filler material can include micro-scale metal structures, such as metal powder, metal flakes, or metal filaments. The metal can include, Ni, Ag, or Cu. For metal powders, the diameter of the powders can be, for example, about 0.1 µm to about 10 µm (e.g., about 0.1 µm, about 0.2 µm, about 0.3 µm, about 0.5 µm, about 1 µm, about 2 µm, about 3 µm, about 5 µm, or about 10 µm, including any values and sub ranges in between). For metal filaments, the length of the filaments can be about 10 µm to about 300 µm (e.g., about 10 µm, about 20 µm, about 30 µm, about 50 µm, about 100 µm, about 200 µm, or about 300 µm, including any values and sub ranges in between).

Printing a Thin-Film Battery for a 3D Printed Lens

FIG. 5 shows a schematic of electronic eyewear 500 including a thin film battery 520 fabricated by additive manufacturing, such as 3D printing. The eyewear 500 includes a lens 530 disposed within a lens frame 532. An electronic component 550, such as an electro-active component or transparent display, is disposed in the lens 530 to provide additional functionality to the eyewear 500.

The eyewear 500 includes a first coil 510 to receive electrical power from an external device (not shown in FIG. 5). The received energy is transmitted wirelessly to a second coil 520 via, for example, inductive charging or magnetic resonance charging. A thin film battery 540 (also referred to as a power band) is disposed substantially around the electronic component 550 to store the electrical energy received by the second coil 520 and provide power to the electronic component 550. Using two coils to relay energy to the battery 540 eliminates the need for a physical connection between the battery 540 and an antenna (e.g., the first coil 510) that might otherwise obstruct the user's vision through part of the lens 530.

The eyewear 500 can be manufactured via several methods. In one example, the first coil 510, the second coil 520, the thin film battery 540, and the electronic component 550 can be disposed on a substrate, and the lens 530 can be formed using 3D printing around these electronic components (e.g., following the processes shown in FIGS. 1A-1D). In another example, these electronic devices, except the thin film battery 540, can be disposed on a substrate, after which the thin film battery 540 can be printed (see details below). The lens 530 can then be printed around the thin-film battery 540 and other electronics.

In yet another example, the electronic component 540 can be disposed on a substrate and then the thin film battery 540 can be printed around the electronic component 550. The first coil 510, the second coil 520, and/or any conductive traces connecting the components being embedded in the lens can then be printed using conductive resin (or any other appropriate conductive ink). The manufacturing can follow the processes shown in FIGS. 1A-1D to form the lens 530. In yet another example, part of the electronic component 550, such as an electro-active element, can also be printed, using the method 400 illustrated in FIGS. 4A-4D.

The thickness of the thin film battery 540 can be less than 2 mm (e.g., less than 2 mm, less than 1.5 mm, less than 1 mm, less than 900 less than 800 less than 700 less than 600 less than 500 less than 400 or less than 300 including any values and sub ranges in between). Because the battery 540 can be so thin, it can have almost any shape. The thin film battery 540 can be embedded into the lens 530. Alternatively, the thin film battery 740 can be disposed on the front surface or the back surface of the lens 530.

Printing processes can be employed to fabricate the thin film battery 740. In general, the fabrication process for a printed battery can start by selecting the printing tool, followed by tailoring the rheological properties (e.g., viscosity) of the inks used to print the battery's active layers, current collectors, and electrolyte. The non-printed components of the thin film battery 740 can serve as supports for the printed components.

In some cases, the thin film battery 740 can be fabricated using a dispenser printing technique, in which an ink syringe is employed to deposit ink over a substrate. The ink can be printed in the form of filaments or drops by modulating the pressure in an ink container (e.g., an ink barrel). The opening of the syringe can have a diameter from about 0.5 µm to about 400 µm (e.g., about 0.5 µm, about 1 µm, about 2 µm, about 3 µm, about 5 µm, about 10 µm, about 20 µm, about 30 µm, about 50 µm, about 100 µm, about 200 µm, about 300 µm, or about 400 µm, including any values and sub ranges in between). The larger-diameter needles can be made of stainless steel and smaller-diameter needles can be made of pulled glass capillaries. The amount of pressure to force the ink through the syringe can depend on the diameter of the needle in the syringe and the viscoelastic behavior of the ink. The shear thinning behavior of the ink enables printing at considerably lower pressures.

Dispenser printing can be used to print inks over areas ranging from about 100 µm$^2$ to 1 m$^2$ by drawing patterns in the form of repeated lines or drops. Dispenser printing large electrodes may be slower than other printing methods, but dispenser printing can be better for printing small electrodes over a defined location. Due to the non-contact nature of dispenser printing, the ink can be printed over uneven surfaces.

In practice, the dispenser printing technique can be used to fabricate the active layers and polymer electrolyte on glass substrates with pre-patterned current collectors formed by lithography. For example, the thin film battery 540 can include a 3D lithium-ion battery with interdigitated electrodes can be fabricated using the dispenser printing technique. In this example, a syringe can be employed to extrude concentrated inks of lithium iron phosphate (LFP) and LTO-based inks over lithographically patterned gold current collectors. Fine filaments of the concentrated inks can be formed by printing the ink through a glass needle (e.g., having a diameter of about 30 µm).

The shear thinning behavior of the inks can cause the flow of concentrated inks through small nozzles. A system of high-boiling-point solvent and volatile solvent can be used to control ink solidification and adhesion during patterning. The evaporation of the volatile solvent during the printing process can lead to partial solidification of the printed filament, and the remaining high-boiling-point solvent can function as a humectant to promote bonding between the individual layers.

The battery can be enclosed inside a plastic casing and the liquid electrolyte (e.g., $1_M$ LiClO$_4$ in 1:1 ratio of ethylene carbonate/dimethyl carbonate by volume) can be used to provide ionic contact to the anode and cathode. More information on this technique can be found in K. Sun, T.-S. Wei, B. Y. Ahn, J. Y. Seo, S. J. Dillon, J. A. Lewis, 3D Printing of Interdigitated Li-Ion Microbattery Architectures, *Adv. Mater.*, 25, 4539 (2013), which is hereby incorporated by reference in its entirety.

In another example, the thin film battery 740 can include a Zn—MnO$_2$ battery printed with a solid polymer gel electrolyte containing an ionic liquid. The MnO$_2$ ink, polymer separator, and zinc ink can be printed sequentially onto a stainless-steel foil. The polymer gel electrolyte can include 1:1 mixture of PVDF-HFP and 0.5$_M$ solution of zinc trifluoromethanesulfonate (Zn$^+$Tf) salt dissolved in BMIM$^+$Tf. The resulting cells can have a footprint of about 0.1 cm$^2$ to about 2 cm$^2$ and a total thickness of about 80 to about 120 µm. More information on this technique can be found in C. C. Ho, J. W. Evans, P. K. Wright, "Direct write dispenser printing of a zinc microbattery with an ionic liquid gel electrolyte," *J. Micromech. Microeng.*, 20, 104009 (2010), which is incorporated by reference in its entirety.

In yet another example, the thin film battery 740 can include a Zn—AgO battery fabricated by a process where the ink can be forced through the needle with compressed gas. In this process, the low-viscosity nanoparticle silver ink can be disposed by dragging a meniscus of the ink over a glass substrate. Low vacuum can be applied inside the ink cartridge to control the meniscus of the ink. Once the silver ink is printed, the electrodes can be annealed to remove the dispersing solvent and assist with fusing of the nanoparticles. The Zn-AgO battery can be formed by electrodepositing Zn onto one electrode and oxidizing the other electrode. More information on this technique can be found in A. M. Gaikwad, J. W. Gallaway, D. Desai, D. A. Steingart, "Electrochemical-Mechanical Analysis of Printed Silver Electrodes in a Microfluidic Device," *J. Electrochem. Soc.* 158, A154 (2011), which is hereby incorporated by reference in its entirety.

In some cases, the thin film battery 740 can be fabricated using inkjet printing, which can have a high-resolution (e.g., about 1200 drops per inch, or DPI). The resolution of the pattern depends on the quality of ink and characteristics of the print head. The drops (also referred to as droplets) can be formed by mechanically compressing the ink through a nozzle (e.g., using a piezoelectric head) or by heating the ink to increase its pressure. The final thickness of the printed electrode depends on the number of drops, the volume of the drop, the concentration of the ink and the footprint of the printed area.

For example, the thin film battery 740 can include a Zn—Ago battery fabricated using inkjet printing. Once the electrodes are printed and baked, they can be dipped in a bath with a KOH/ZnO electrolyte. Zn can be electrodeposited onto one electrode and the silver onto the counter electrode can be oxidized, forming a Zn—AgO battery. More details about this technique can be found in C. C. Ho, K. Murata, D. A. Steingart, J. W. Evans, P. K. Wright, A super ink jet printed zinc-silver 3D microbattery, *J. Micromech. Microeng.* 2009, 19, 094013 (2009), which is hereby incorporated by reference in its entirety.

In another example, the thin film battery 740 includes a lithium-ion battery, where the active electrodes (e.g., Lithium cobalt oxide or LCO, and lithium titanate or LTO) can be printed on current collector foils. Inkjet printable inks can be prepared by ball milling a mixture of active particles, carbon black, and polyvinylidene fluoride or polyvinylidene difluoride (PVDF) binder with a small fraction of surfactant (e.g., Tween-80/FC-4430) in NMP/propylene carbonate (1:1) at 1000 RPM for 24 hours. Ball milling the particles can reduce the particle size and the surfactants can reduce the coagulation rate by increasing the steric repulsion between the particles. The thicknesses of the active layers can be about 1 µm to about 20 µm.

3D Printed Electro-Active Spectacle Lenses

FIG. 6A shows a schematic of electronic circuitry 660 suitable for encasing in resin or other curable material suitable for printing an ophthalmic lens. The electronic circuity 660 includes a first coil 610 that can be attached to the bulk lens component to receive wireless energy or power from an external device (not shown in FIG. 6A). A second coil 620 is attached to the bulk lens component 630 to receive wireless energy or power from the first coil 610 and transmit the received energy to an energy storage unit 640 (also referred to as an energy storage element 640). The lens 630 can have optical power or not, depending on the application, which can range from vision correction to eye protection to virtual reality (VR), augmented reality (AR), or mixed reality (MR). The energy storage unit 640 provides at least part of the power for an electro-active element 650 (e.g., a liquid crystal element, an electro-chromic element, or other electro-active component).

The electronic circuitry 660 adds functions to the lens 630. If the electronic component 650 includes an electro-active element, such as a liquid crystal or electrochromic element, it can provide a variable optical power or tint for the wearer. More information about electro-active elements can be found in U.S. Pat. No. 9,155,614 B2, which is incorporated herein by reference in its entirety. The electronic element 650 could also include an electronically actuated filter, such as a band-reject filter that blocks IR light, UV light, or certain colors. A sensor embedded in the lens and connected to the filter may turn the filter on and off automatically in response to intense IR light, UV light, or certain color(s), e.g., to protect the user's eyes. If the electronic component 650 includes a UV sensor to detect the level of UV radiation, detection of a high level of UV light may trigger a decrease in the transmission of UV light to protect the wearer's eyes.

The electronic component 650 can include be coupled to other sensors as well. For example, the electronic component 650 can include an accelerometer to monitor the motion of the wearer. If the wearer moves, in a particular direction (e.g., he or she looks up or down), the accelerometer may trigger a change in the lens's optical power provided by an electro-active focusing element. If the sensors include a photodetector that detect ambient light, the detection of changes in ambient light by the photodetector can be used to control the refractive index or transmission of the embedded electro-active element.

The electronic component 650 can further include a range finder to measure distance between the wearer and an object of interest. This distance can be used to control the optical power (focal length) of the lens 630. In yet another example, the electronic component 650 can further include an inter-pupil distance sensor to measure the distance between the two pupils of the wearer. The electronic component 650 can increase or decrease the optical power in response to the inter-pupil distance of the wearer. In yet another example, the electronic component 650 can further include a thermosensor to measure temperature, such as ambient temperature.

The electronic component 650 can further include one or more circuits, such as an application specific integrated circuit (ASIC) or other processor, to control the other components in or coupled to the lens. In another example, the electronic component 650 can include circuits for frequency modulation and demodulation. This circuit can allow the first coil 610, the second coil 620, and/or another antenna to receive and transmit modulated signals. In yet another example, the electronic component 650 can further include one or more resonance circuits to transmit and receive signals or power as discussed below. The electronic component 650 can further include a data storage unit, such as a memory or buffer, to store programs for the processor, sensor data, and status information.

Electronic Eyewear with 3D Printed Lenses

FIG. 6B shows a schematic of an ophthalmic lens system 600 including a 3D printed lens 630 encasing the electronic circuitry 660 of FIG. 6A. The lens 630 is disposed in a lens frame 632 and can be manufactured by placing the electronic circuitry 660 of FIG. 6A on a substrate (e.g., the substrate 110 shown in FIGS. 1A-1D) and forming, via additive manufacturing, optical segments on both sides of the electronic circuitry 660. These optical segments form a bulk lens component partially or completely surrounding the electronic circuitry 660. A lens frame material can then be printed around the bulk lens component 630 to form the lens frame 632. Part of the electronic circuitry 660 can be printed as well, including the electrical connections between components (e.g., the traces between the second coil 620 and the energy storage unit 640 and between the energy storage unit 640 and the electronic component 650).

The ophthalmic lens system 600 can be used in various applications, including as a spectacle lens that provide dynamic vision correction. Other embodiments of the ophthalmic lens system 600 include electronic contact lenses, in which case the lens frame 632 can be made of or replaced by a soft material, such as a hydrogel. The ophthalmic lens system 600 can also be modified (e.g., by changing the shape of the lens 630) for use in non-ophthalmic applications, including but not limited to electronic instrument lenses, electronic diagnostic lenses, electronic security lenses, and in electronic camera lenses (including those used for healthcare), manufacturing (e.g., in protective goggles), bar code scanning (e.g., the electronic component 650 can include a bar code reader), visual inspection, communications (e.g., for video calls or video conferences), and transportation (e.g., the electronic component 650 can provide drive directions to drivers).

3D Printed Lenses with Embedded Coils for Wireless Power Transfer

The first coil 610 shown in FIG. 6B is disposed between the lens 630 and the lens frame 632. In another example, the first coil 610 can be embedded in or affixed to the bulk lens component 630. In this case, the first coil 610 can be made of transparent conductive material, such as ITO or another transparent conductive oxide (TCO). Alternatively, the first coil 610 can be disposed around a periphery of the bulk lens component 630 (i.e., substantially close to the lens frame 632) to reduce interference with the wearer's vision. In this instance, the first coil 610 can also be used to define the 3D printing boundary. The first coil 610 (and other electronics) can be disposed on a substrate and the printer only disposes the lens material in the area within the first coil 610. In yet another example, the first coil 610 can be around the thickness of the lens 630. In yet another example, the first coil 610 can be disposed on the front or back surface of the lens 630.

In yet another example, the first coil 610 can be integrated into the lens frame 632. For example, the lens frame 632 can include hollow tubes and the first coil 610 can be disposed within the hollow tubes. In yet another example, the first coil 610 can be disposed at the front or back surface of the lens frame 632.

The first coil 610 can also be disposed away from the lens 630. For example, the first coil 610 can be disposed on the lens frame 632, the temple portion of the lens frame 632, or the eye wire portion of the lens frame 632. In these cases, the second coil 620 can be disposed in or on the lens 630 and is electrically coupled to the electronic component 650 to power the electronic component 650 (e.g., the energy storage element 640 can be optional here). The second coil 620 can be also connected to a controller (not shown in FIGS. 6A or 6B) to control the voltage transmitted to the electronic component 650. The controller can also control the modulation, frequency, power, and/or other parameters of the signals sent to the electronic component. In yet another example, the external device controls the voltage, power, frequency, and other parameters of signals (including energy) transmitted to the first coil 610. In this case, the number of components included in the lens 630 or the lens frame 632 can be reduced.

FIG. 6B shows that the first coil 610 and the second coil 620 each include a single loop. Alternatively, each of the first coil 610 and the second coil 620 can include multiple loops. In one example, the multiple loops are formed by the same conductive wire. In another example, the multiple loops are formed by multiple wires and can be substantially concentric with each other.

The first coil 610 can communicate with the external device in various ways. In one example, the first coil 610 receives energy from the external device, which can be a wireless charger or any other device that can transmit wireless energy. In another example, the first coil 610 can receive control signals from the external device so as to control the operation of the electronic component 650. In yet another example, the first coil 610 can receive data from the external device. In this case, the external device can include a controller, a processor, a smartphone, a computer, a laptop, a tablet, or any other appropriate devices with a wireless transmitter.

The first coil 610 can also transmit signals to the external device. For example, the first coil 610 can transmit the operating status of the electronic component 650 to the external device, which can analyze the operating status and provide control signals based on the operating status of the electronic component 650. In another example, the first coil 610 can transmit status information about the energy storage unit 640 to the external device. In response to an indication of low energy storage, the external device can initiate a charging process to charge the energy storage unit 640.

Alternatively, the charging of the energy storage unit 640 can be automatic. For example, as long as the external device and the first coil 610 are within a threshold distance, the charging process can start. The threshold distance can be about 25 cm or less (e.g., about 5 cm, about 10 cm, about 20 cm, including any values and sub ranges in between). The charging can also be continuous or periodic. For example, the external device can include a docking station (also referred to as a dock) to receive and secure the first coil 610 (and the lens 630) for charging.

The first coil 610 and the external device can communicate and/or transfer energy using various technologies. In one example, the first coil 610 and the external device can be inductively coupled. In this case, the external device can transmit energy to the first coil 610 via inductive charging.

In another example, the external device and the first coil 610 can be resonantly coupled. For example, the external device can function as a resonant transformer to transmit energy to the first coil 610 via magnetic resonance power transfer. Magnetic resonance power transfer is transmission of electrical energy between two coils that are tuned to resonate at the same frequency. Without being bound by any particular theory of mode of operation, based on the principles of electromagnetic coupling, resonance-based chargers can inject an oscillating current into a highly resonant coil (e.g., a coil included in the external device) to create an oscillating electromagnetic field. Another coil (e.g., the first coil 610) with the same resonant frequency can receive power from the electromagnetic field and convert the power back into electrical current that can be used to power the electronic component 650 and/or charge the energy storage unit 640.

Magnetic resonance wireless transfer is a non-radiative mode of energy transfer, relying instead on the magnetic near field. Magnetic fields usually interact weakly with biological organisms, including people and animals, and therefore are regarded as safe for biological application.

Resonance charging can offer unique advantages in spatial freedom, allowing the external device, which is also referred as the resonance charger, to be separated from the first coil 610. In one example, the first coil 610 and the external device are coupled via near field resonant coupling. In this case, the distance between the external device and the first coil 610 can be substantially equal to or less than 5 times the diameter of the first coil 610. Near field resonant coupling can have high efficiency, depending on the refractive orientation of the first coil 610 and the transmitting coil included in the external device.

In another example, the first coil 610 and the external device are coupled via mid-field resonant coupling, in which the distance between the external device and the first coil 610 can be about 5 times to about 1000 times of the diameter of the first coil 610. Power transmission efficiency in mid-field resonant coupling can depend on the relative angular orientation of the first coil 610 and the transmitting coil included in the external device.

In yet another example, the first coil 610 and the external device are coupled via far-field resonant coupling, in which the distance between the external device and the first coil 610 is greater than 1000 times of the diameter of the first coil 610. Far-field resonant coupling can be less sensitive to the angular orientation of the first coil 610 relative to the transmitting coil in the external device. The two coils (first coil 610 and the transmitting coil in the external device) can be impedance matched to increase the transmission efficiency. For example, the shapes, dimensions, and resistances of the two coils 610 and 620 can be configured to achieve impedance matching.

Other techniques can also be used to transfer energy from the external device to the first coil 610. In one example, the first coil 610 can receive energy using radio frequency identification (RFID) technology, which allows the external device to transmit energy to the first coil 610 via RF waves. RFID technology also allows the external device to transmit and read data to and from the first coil 610. In another example, the external device can transmit energy to the first coil 610 via microwaves. In yet another example, the external device can transmit energy to the first coil 610 via ultrasound waves.

In yet another example, the external device can communicate with the first coil 610 via WiFi signals. In yet another example, the external device can communicate with the first coil 610 via Bluetooth signals. In these cases, the communications between the external device and the first coil 610 can be two-way, i.e., the first coil 610 can also transmit data to the external device.

The first coil 610, in response to receiving the electrical energy from the external device, excites and energizes the second coil 620. This transfers the electrical energy to the second coil 620. In this manner, the first coil 610 can function as a repeater or part of a repeater to relay the electrical energy from the external device to the second coil 620. In one example, the energy transfer between the first coil 610 and the second coil 620 can be achieved using non-resonant inductive charging. Since the first coil 610 is close to the second coil 620, the efficiency of this induction charging can be high. In another example, the energy transfer between the first coil 610 and the second coil 620 can be achieved using resonant charging as described above. Other than transferring energy, the first coil 610 can also function as an antenna to transmit controls signals or data to the second coil 620.

The energy storage element 640 can use various techniques to store energy provided by the second coil 620. In one example, the energy storage unit 640 includes a battery, such as a rechargeable battery. Due to convenient recharging using the wireless energy transfer techniques described above, the battery used in the ophthalmic lens system 600 can have a small size. For example, the lateral dimension (length) of the battery can be less than 2.5 cm (e.g., less than 2.5, less than 2 cm, less than 1.5 cm, less than 1 cm, less than 8 mm, or less than 5 mm, including any values and sub ranges in between). The rechargeable battery can use a thin film battery (e.g., thin film lithium ion battery) to achieve a small form factor of the ophthalmic lens system 600.

In another example, the energy storage element 640 can include a capacitor, supercapacitor, or ultra-capacitor. A supercapacitor can store up to 15-35 Watt-hours of electrical energy per kilogram of its weight.

In FIG. 6B, the energy storage element 640 is disposed away from the electronic component 650. In another example, the energy storage element 640 can be disposed within the electronic component 650. In yet another example, the energy storage element 640 can be disposed on the lens frame 632. In yet another example, the energy storage element 640 can be disposed along a periphery of the lens 630. In yet another example, the energy storage element 640 can be disposed along a periphery of the electronic component 650. In yet another example, the energy storage element 640 can be disposed substantially parallel to the first coil 610. An insulating layer can be disposed between the first coil 610 and the energy storage unit 640.

Although various components are shown in FIGS. 6A and 6B, some components are optional. For example, the ophthalmic lens system 600 can operate without the first coil 610, in which case the second coil 620 receives energy directly from an external device. In another example, the ophthalmic lens system 600 can operate without the energy storage unit 640. In this instance, the user can bring an external power supply during use and the external power supply can transmit wireless energy to the ophthalmic lens system 600.

Electronic Eyewear with 3D Printed Electro-Active Lenses

Figure 7:
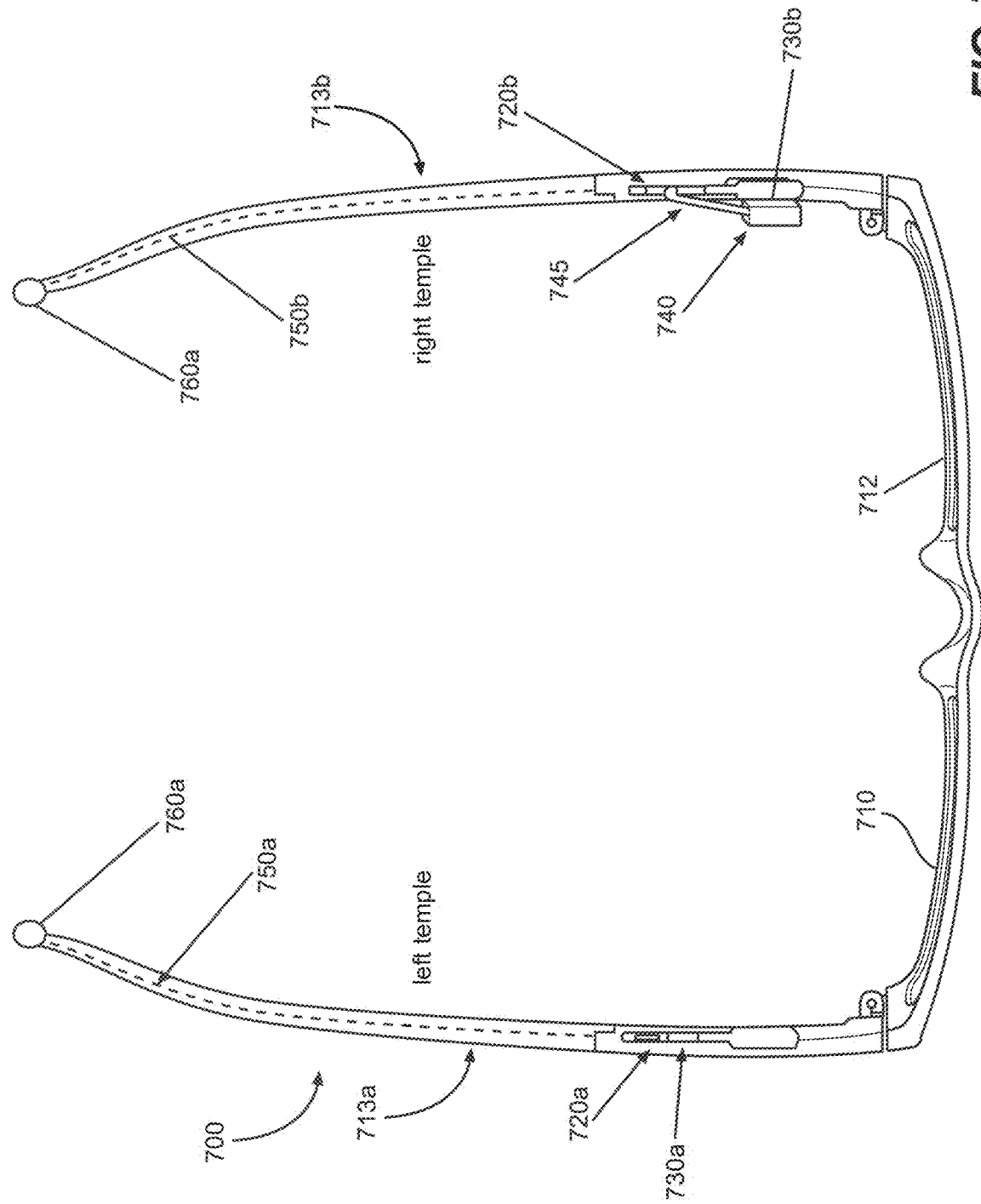
FIG. 7 shows a schematic of electronic eyewear with electro-active lenses manufactured by 3D printing.

FIG. 7 shows a schematic of electronic eyewear 700 with electro-active lenses 710 made using 3D printing. The lenses 710 are disposed in a lens holder 712, which is connected to a pair of temples 713a and 713b (collectively referred to as the temples 713). The lens holder 712 and the temples 713 form a lens frame. The lenses 710 can include electronic circuitry (e.g., 120 in FIGS. 1A-1D) embedded in an optical element. The frame also includes various electronics. For example, the first temple 713a includes a first power supply 720a and a first electronic module 730a, and the second temple 713b includes a second power supply 720b and a second electronic module 730b. A removable electronic module 740 is also attached to the second temple 713b via a connector 745. In addition, the temples 713 also includes wires 750a and 750b (collectively referred to as wires 750) connected to two additional electronic modules 760a and 760b (collectively referred to as additional electronic modules 760), which may contain conventional or bone conduction speakers.

The lens frame, including the lens holder 712 and the temples 713, can be fabricated using 3D printing to fit around and connect to the lenses 710. For example, all the electronics (e.g., power supply 720, electronic modules 730, connector 745, wires 750, and additional electronic modules 760) can be disposed on a substrate, and a printer disposes droplets of lens frame material (e.g., resin, plastic, polymer, or any other appropriate material) around the electronics to form the lens frame, either piece-by-piece or as single integrated unit. In one example, the electronics in the lens frame can be connected to the electronics in the lenses 710 before printing the lens frame. In another example, the lens frame can be printed separately and then electrically and mechanically connected to the lenses 710.

In one example, the electronics in the lens frame are connected to electronics in the lenses 710 via wires. These wires can be connected, for example, at the interface between the lens holder 712 and the temples 713. In another example, the electronics in the lens frame are connected to the electronics in the lenses 710 via wireless connection. For example, the electronic modules 730 can include one or more wireless transceivers and the lenses 710 can include an antenna (see, e.g., FIGS. 6A and 6B) to communicate with the electronics on the lens frame. The lenses 710 can also include an antenna to receive signals and/or electrical power from the power supply 720 disposed on the lens frame.

The removable electronic module 740 can be connected to or removed from the eyewear 700 during use. For example, the removable electronic module 740 can include a back-up power supply that provides power to electronic components embedded in the lenses 710. In another example, the removable electronic module 740 can include wireless transceivers to allow the eyewear 700 to communicate with external devices, such as a smartphone or electro-active lenses 710.

The removable electronic module 740 can be coupled to the frame via a docking station in formed or mounted in the second temple 713b. More details of the docking station approach can be found in U.S. Pat. No. 9,122,083 B2, filed Jul. 24, 2015, and entitled "EYEWEAR DOCKING STATION AND ELECTRONIC MODULE," which is hereby incorporated by reference in its entirety.

The electronic modules 730, the removable electronic module 740, and the additional electronic modules 760 can perform various types of functions, such as audio playback, audio recording, acoustic amplification, acoustic canceling, hearing aid, video playback, video recording, photography, fall detection, alertness monitoring, pedometer, geo-location, pulse detector, wireless communication, virtual reality, augmented reality, gaming, eye tracking, pupil monitoring, lens control, automated reminder, lighting, lasing, and alarm.

In some cases, the electronics in the lens frame include a controller (e.g., included in any of the electronic modules 730, the removable electronic module 740, and the additional electronic modules 760) to control the operation of the electronic circuitry in the lens 710. For example, the controller can control the focus, tint, or other optical properties of the lenses 710. The control of the lens operation can be based on conditions sensed by one or more detectors in the electronics on the lens frame, such as lighting conditions, object distance, temperature, and humidity.

The power supply 720 can include, for example, one or more of a rechargeable battery, disposable battery, fuel cell, solar cell, or kinetic energy source whereby movement of the eyewear generates power. Although two power supplies 720 are illustrated in FIG. 7, in practice, a single power supply can be used as well.

Additional Examples of 3D Printed Electro-Active Spectacle Lenses

Figure 8:
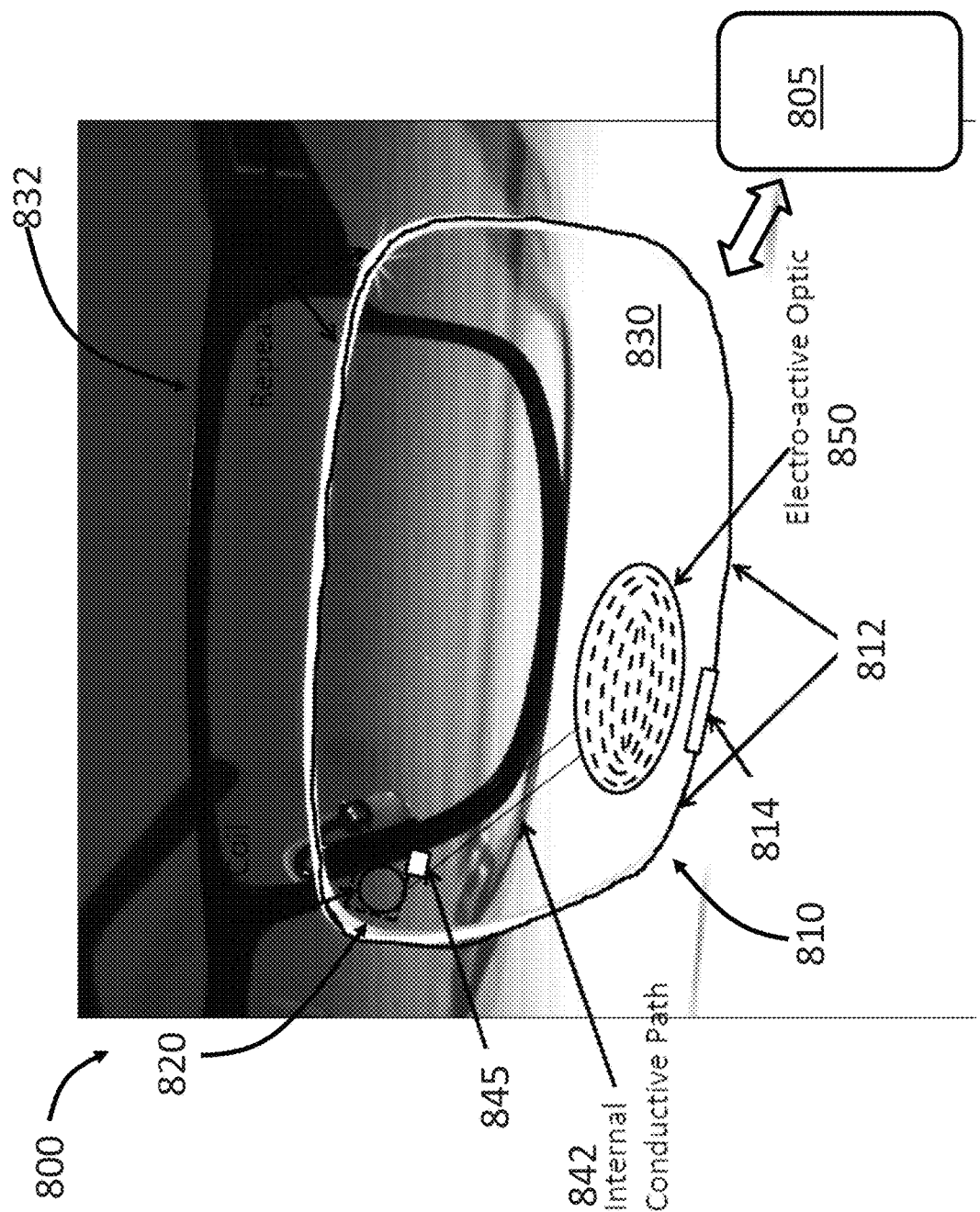
FIG. 8 shows a 3D printed ophthalmic lens with an embedded coil for wireless charging.

FIGS. 8-12 show additional electronic eyewear with 3D printed lenses with embedded electronics. FIG. 8 shows an electronic eyewear system 800 including a repeater for wireless charging and fabricated by 3D printing. The system 800 includes a lens frame 832 to hold a lens 830. A first coil 812 is disposed between the lens 830 and the lens frame 832 to receive energy wireless from an external device 805. A repeater component 814 is operably coupled to the first coil 812 to form a repeater 810 so as to facilitate wireless energy transfer between the first coil 810 and the external device 805. A second coil 820 is printed with conductive resin inside the lens 830 to receive electrical energy transmitted by the first coil 812 and transmit the received energy to an electronic component 850 (e.g., an electro-active element) via an internal electronic component 845 and a conductive path 842, which may also be printed with conductive resin as described above.

The system 800 can be configured as spectacles that provide dynamic vision correction, dynamic tinting, and/or augmented reality. The conductive path 842 can be made of transparent conductive resin disposed within the lens 830 to reduce potential interference with the wearer's vision. The second coil 820 shown in FIG. 8 is disposed at a corner of the lens 830. Alternatively, the second coil 820 can be disposed at a periphery of the electronic component 850 and can be substantially concentric with the first coil 812 so as to increase the efficiency of wireless energy transfer. In this case, the second coil 820 can also be made of transparent conductive resin and can be printed during the lens 830 fabrication process.

The system 800 can further include an optional energy storage element (not shown), such as the 3D printed battery shown in FIGS. 4A-4C, to store energy received by the second coil 820. Alternatively, the electronic component 850 may be powered directly by the second coil 820. In this case, the external device 805 can provide continuous charging to the first coil 810 to allow continuous operation of the electronic component 850.

The system 800 can be manufactured in at least several ways. In one example, the individual electronic components, including the first coil 812, the second coil 820, the electronic component 850, and the internal electronic component 845, are placed on a substrate. The conductive path 842 is then printed using conductive resin to electrically connect the second coil 820 with the electronic component 850. The lens 830 is then printed (e.g., using the process illustrated in FIGS. 1A-1D), followed by printing of the lens frame 832. In another example, the lens frame 832 can be printed first to define the area of the lens 830, after which the electronic components are disposed within the lens frame 832. The lens 830 is then printed. In yet another example, all the electronic parts, including the conductive pathway 842, can be prefabricated and then placed on a substrate to print the lens 830 and the lens frame 832. In yet another example, the first coil 812 and the second coil 820 can also be fabricated via 3D printing.

Figure 9:
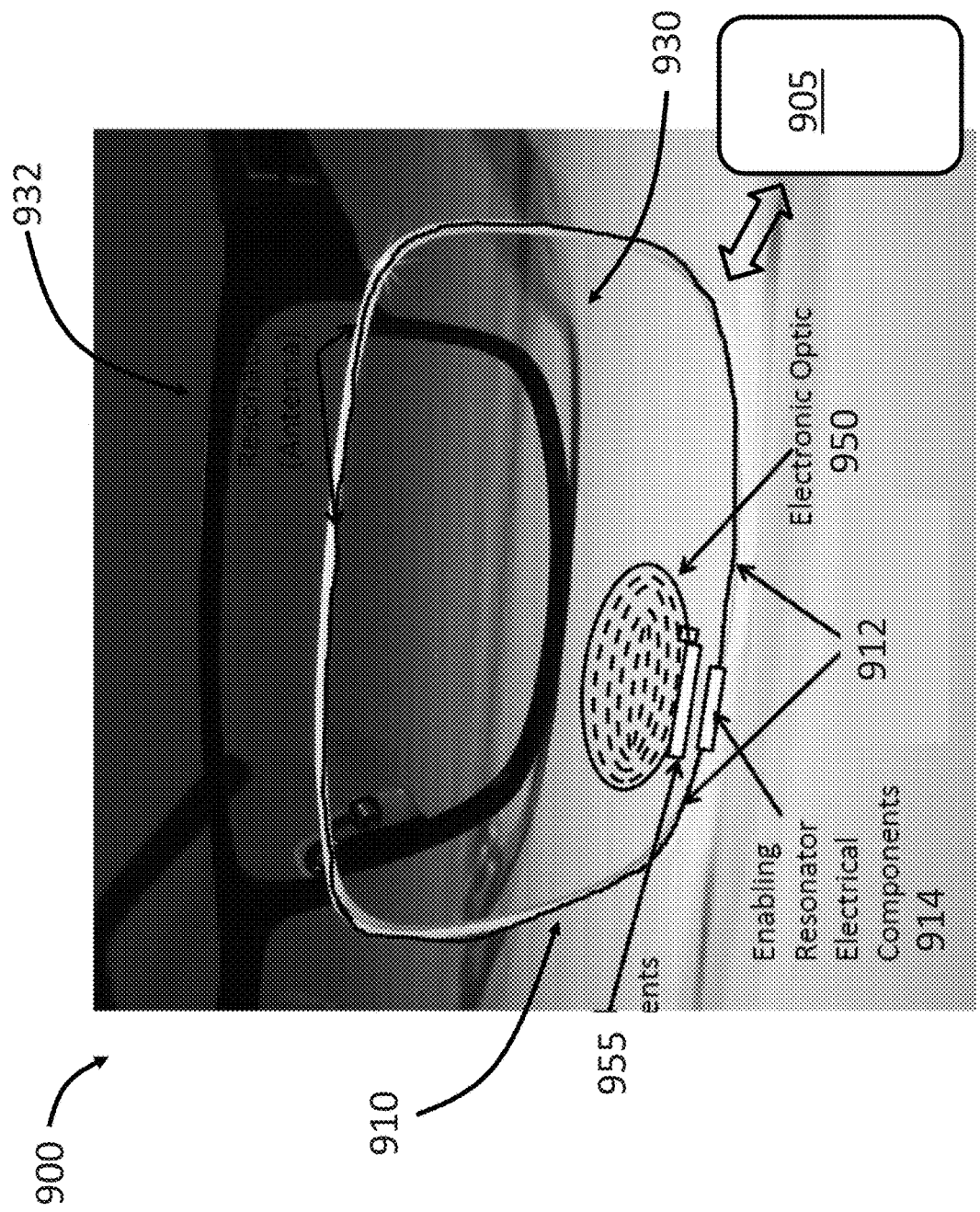
FIG. 9 shows a 3D printed ophthalmic lens including a resonator coil for wireless charging.

FIG. 9 shows a schematic of a 3D printed optical system 900 including a resonator for wireless charging. The system 900 includes a lens frame 932 to hold a lens 930. A first coil 912 is disposed along the periphery of the lens 930 to receive wireless energy from an external device 905. One or more enabling resonator electrical components 914 are operably coupled to the first coil 912 to form a resonator 910, which can increase the efficiency of energy transfer between the first coil 910 and the external device 905. An electronic component 950 is embedded within the lens 930 and is powered by the resonator 910 via an embedded electronic component 955. Placing the resonator electronic 914 and the internal electronic 955 close to each other can improve energy transfer efficiency.

In the system 900, the electronic component 950 can include an electro-active element fabricated via a 3D printing process, e.g., like the one illustrated in FIGS. 4A-4D. The electronic parts, including the resonator 910 and the internal electronics 955, can be placed adjacent to the electronic component 950 to form an assembly on which lens material can be deposited to form the lens 930. The lens frame 932 can be printed before or after printing the lens 930.

Figure 10:
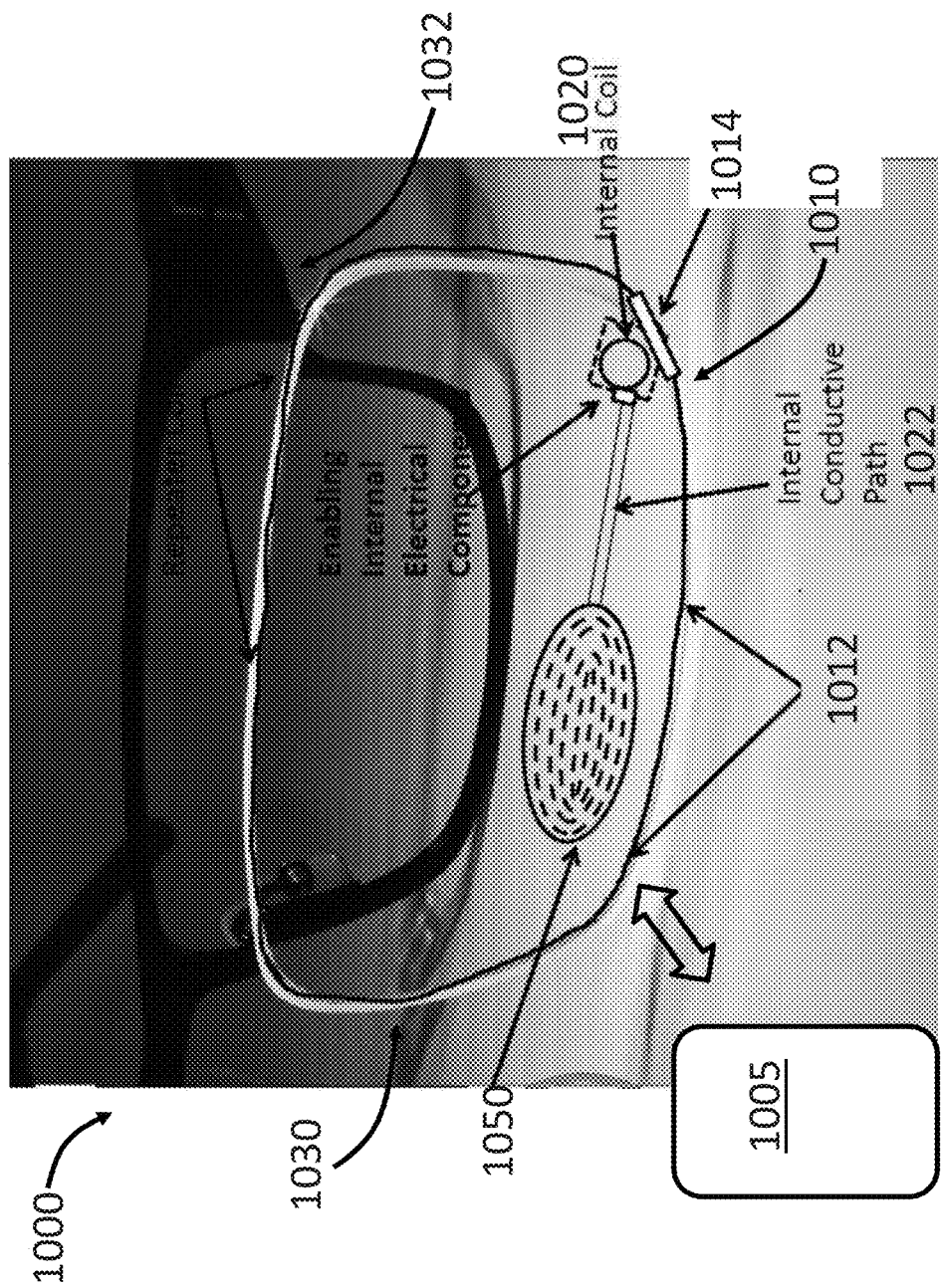
FIG. 10 shows a 3D printed ophthalmic lens with non-resonant coupling between an internal coil and an embedded repeater coil.

FIG. 10 shows a schematic of a printed ophthalmic system 1000 with non-resonant coupling between an internal coil 1020 (also referred to as a second coil or secondary coil) and a repeater coil 1012 (also referred to as the first coil 1012). The system 1000 includes an external device 1005 to wirelessly transmit electrical energy to the first coil 1012, which is disposed between a lens 1030 and a lens frame 1032. A repeater electronic component 1014 is coupled to the first coil 1012 to form a repeater 1010 so as to facilitate energy transfer between the first coil 1012 and the external device 1005. The second coil 1020 is disposed close to the repeater electronic component 1014 to receive energy efficiently from the first coil 1012. A conductive path 1022 is disposed on or in the lens 1030 to conduct the power from the second coil 1020 to an electronic component 1050. Some or all of the components in ophthalmic system 1000, including the lens 1030 and the conductive coils, can be formed using the 3D printing techniques disclosed herein.

Using two or more coils to relay energy from a wireless energy supply to an electronic component or battery in the lens alleviates problems associated with forming electrical connections between the frame 1032 and the lens 1030. A molded electro-active lens may be "edged," or cut to fit in the frame. Edging could cut a wire extending from inside the lens to or beyond the lens's edge. For example, the edging process may smear plastic or debris over the wire, interfering with the electrical connection between the wire and the frame. A 3D printed lens (e.g., lens 1030 in FIG. 10) may not need to be edged—it can be printed to fit in the frame—but aligning a wire extending from a component embedded in the lens to the lens's edge for connection to the frame can still be challenging. Wirelessly coupling the component to the coil in the frame eliminates the need for these wires, simplifying alignment of the lens to the frame and removing potential obstructions from the wearer's field of view.

Figure 11:
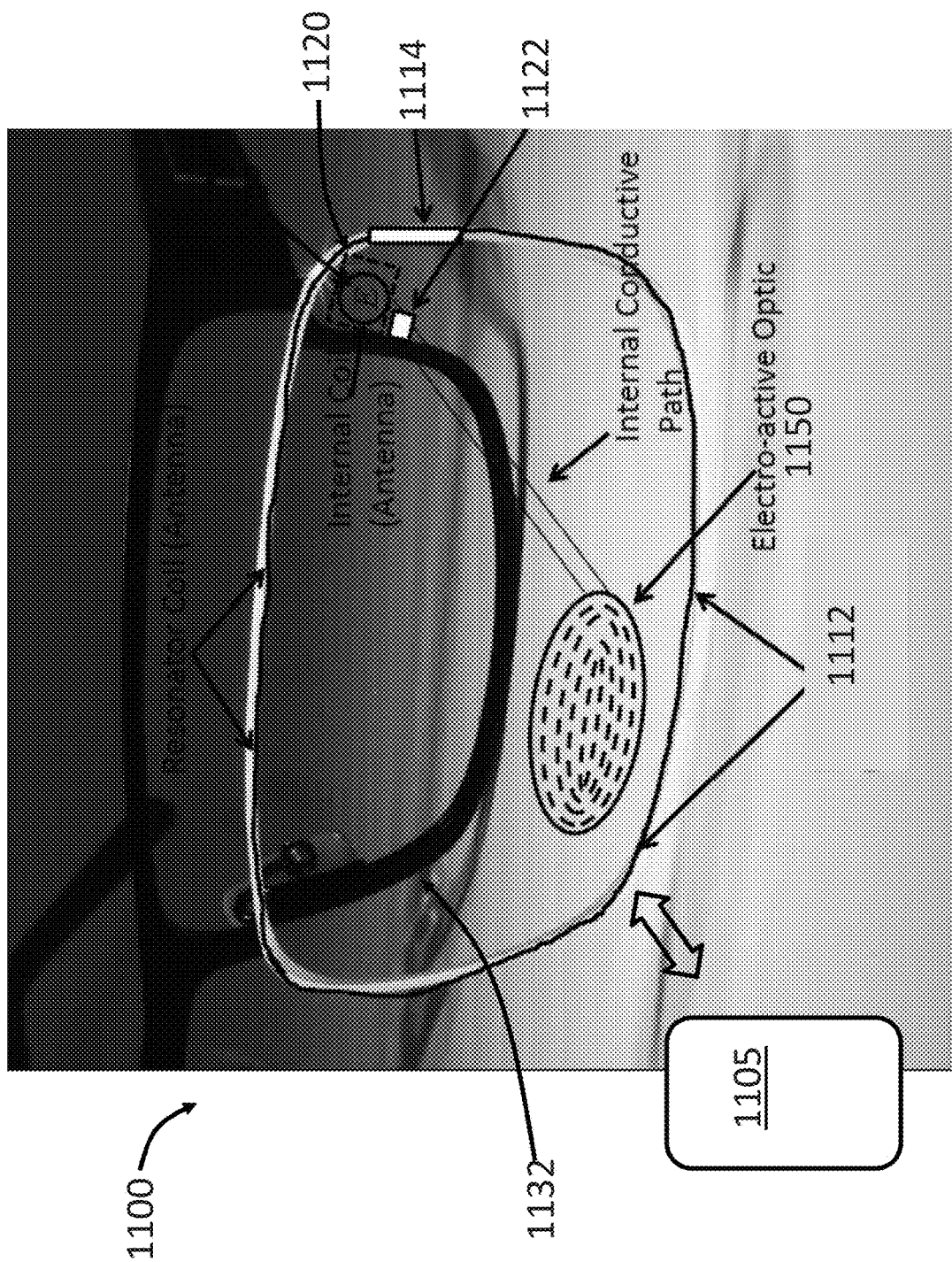
FIG. 11 shows a 3D printed ophthalmic lens system with non-resonant coupling between an internal coil and a resonator coil.

FIG. 11 shows a schematic of a printed ophthalmic system 1100 with non-resonant coupling between an internal coil 1120 and a resonator coil 1112. The system 1100 includes a lens 1130 disposed within a lens frame 1132. A first coil 1112 is sandwiched between the lens 1130 and the lens frame 1132 to receive wireless energy from an external device 1105. A resonator electronic 1114 is coupled to the first coil 1112 to form a resonator 1110, which transmits the energy received by the first coil 1112 to a second coil 1120. The second coil 1120 and the resonator electronic 1114 are disposed in close proximity to each other to increase energy transfer efficiency. The second coil 1120 further transmits the electrical energy to an electronic component 1150 via an internal electronic 1122.

Figure 12:
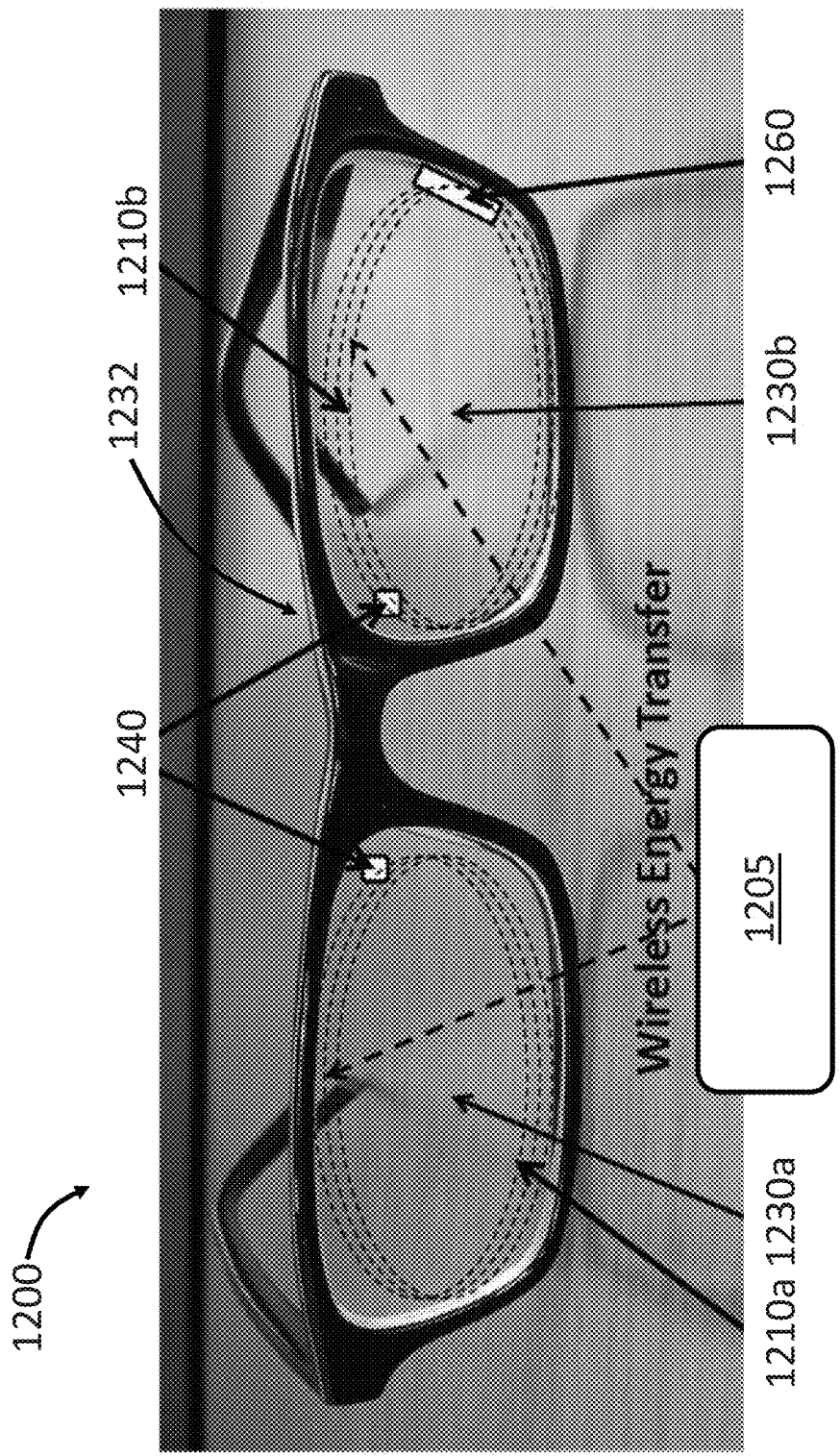
FIG. 12 shows a pair of 3D printed spectacle lenses with embedded coils for wirelessly charging power supplies embedded in the lenses.

FIG. 12 shows a schematic of a pair of printed spectacles 1200 with electronic components that can be powered by wireless charging. The spectacles 1200 include a pair of lenses 1230a and 1230b disposed in a lens frame 1232. Each lens 1230a and 1230b includes electronic components (not shown in FIG. 12), such as electro-active elements as described above. A first group of coils 1210a is coupled to or embedded in the first lens 1230a and a second group of coils 1210b is coupled to or embedded in the second lens 1230b. The two groups of coils 1210a and 1210b may be formed of conductive resin and are configured to receive wireless energy from an external device 1205.

The spectacles 1200 also include two energy storage units 1240, each of which is coupled to a respective group of coils 1210a and 1210b. The energy storage units 1240 can include internal coils to receive energy from the coils 1210a and 1210b, in which case the coils 1210a and 1210b can function as repeaters and/or resonators. The system 1200 further includes a sensor 1260 that is operably coupled to the coils 1210b. The sensor 1260 can include any of the sensors described above, including an accelerometer, a photo detector, a UV detector, a thermo-sensor, a range finder, or a combination thereof.

Each of the two groups of coils 1210*a* and 1210*b*, as shown in FIG. 12, includes three loops. The three loops can be formed by one or more wires. Other numbers of loops can also be used in the coils 1210*a* and 1210*b*. For example, each of the two groups of coils 1210*a* and 1210*b* can include more than three loops (e.g., more than 3, more than 5, more than 10, more than 15, or more than 20, including any values and sub ranges in between). The two groups of coils 1210*a* and 1210*b* include the same number of loops or different numbers of loops for powering electronic devices in each lens (1230*a* or 1230*b*).

The energy storage units 1240 can include thin film batteries that are manufactured via 3D printing as described above with reference to FIG. 5. The energy storage units 1240 can also be manufactured by other methods and placed together with the coils 1210 before the lenses 1230*a* and 1230*b* are printed. The coils 1210 can also be printed.

Figure 13:
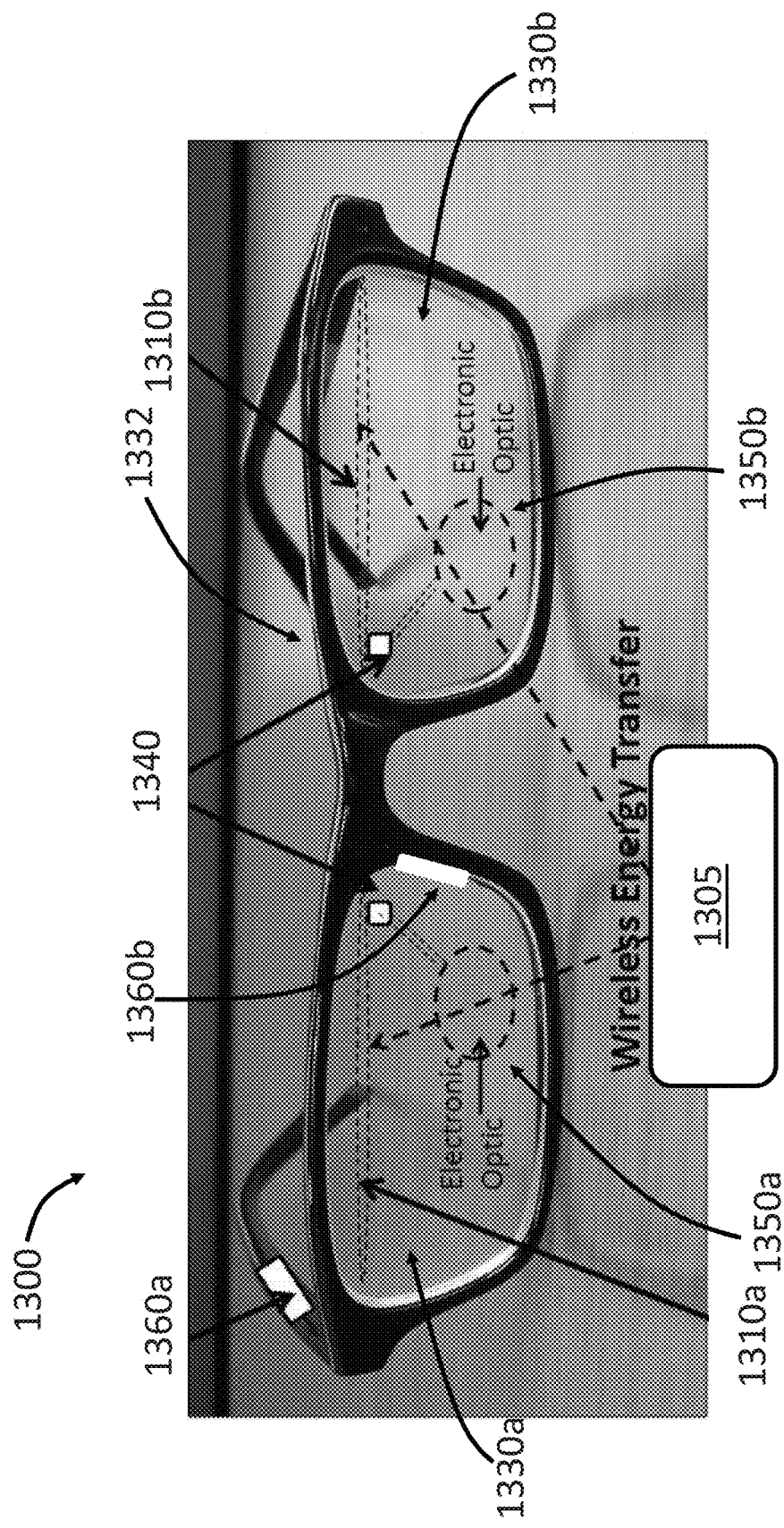
FIG. 13 shows a pair of 3D printed spectacle lenses with wireless charging using embedded coils oriented around the thickness of the lenses.

FIG. 13 shows a schematic of a pair of printed spectacles 1300 with wireless charging using coils 1310*a* and 1310*b* around the thickness of each lens (i.e., in a plane containing or parallel to the corresponding lens's optical axis). The spectacles 1300 include a pair of lenses 1330*a* and 1330*b* disposed in a lens frame 1332. Each of the two lenses 1330*a* and 1330*b* includes a respective printed coil 1310*a* and 1310*b* to receive energy from an external device 1305 so as to power a respective electronic optic 1350*a* and 1350*b*. The coils 1310*a* and 1310*b* are disposed on an upper portion of the respective lens 1330*a* and 1330*b*. The coils 1310*a* and 1310*b* are formed around the thickness of the lenses 1330*a* and 1330*b*, instead of along the periphery of the lenses as seen in, for example, FIG. 12.

The spectacles 1300 also include one or more energy storage elements 1340 to store energy received by the coils 1310*a* and 1310*b*. The energy storage elements 1340 can include internal coils (not shown in FIG. 13) to receive energy from the coils 1310*a* and 1310*b* via, for example, non-resonant or resonant wireless charging.

The spectacles 1300 further include a first sensor 1360*a* disposed on the temple portion of the lens frame 1332 and a second sensor 1360*b* disposed in or on the rim portion of the lens frame 1332. The two sensors can include any of the sensors described above, including forward-facing photodetectors for measuring ambient light levels or backward-facing interpupillary distance sensors. Additional sensors may also be included in the spectacles 1300. The additional sensors can be disposed at any appropriate location, including in or on the rim, lens, temple, or bridge.

During the manufacturing, the coils 1310*a* and 1310*b* (as well as electronic parts) can be placed on a substrate and then the lenses 1330*a* and 1330*b* are printed. Alternatively, a portion of the lens 1330*a* (e.g., the portion above the coil 1310*a*) can be printed first, and then the coil 1310*a* can be printed on the printed portion of the lens 1330*a*, followed by printing of the rest of the lens 1330*a*. The portion of the lens 1330*a* printed before the printing of the coil 1310*a* can provide mechanical support for the coil 1310*a* during manufacturing. A similar process can be used to print the second lens 1310*b*.

Figure 14:
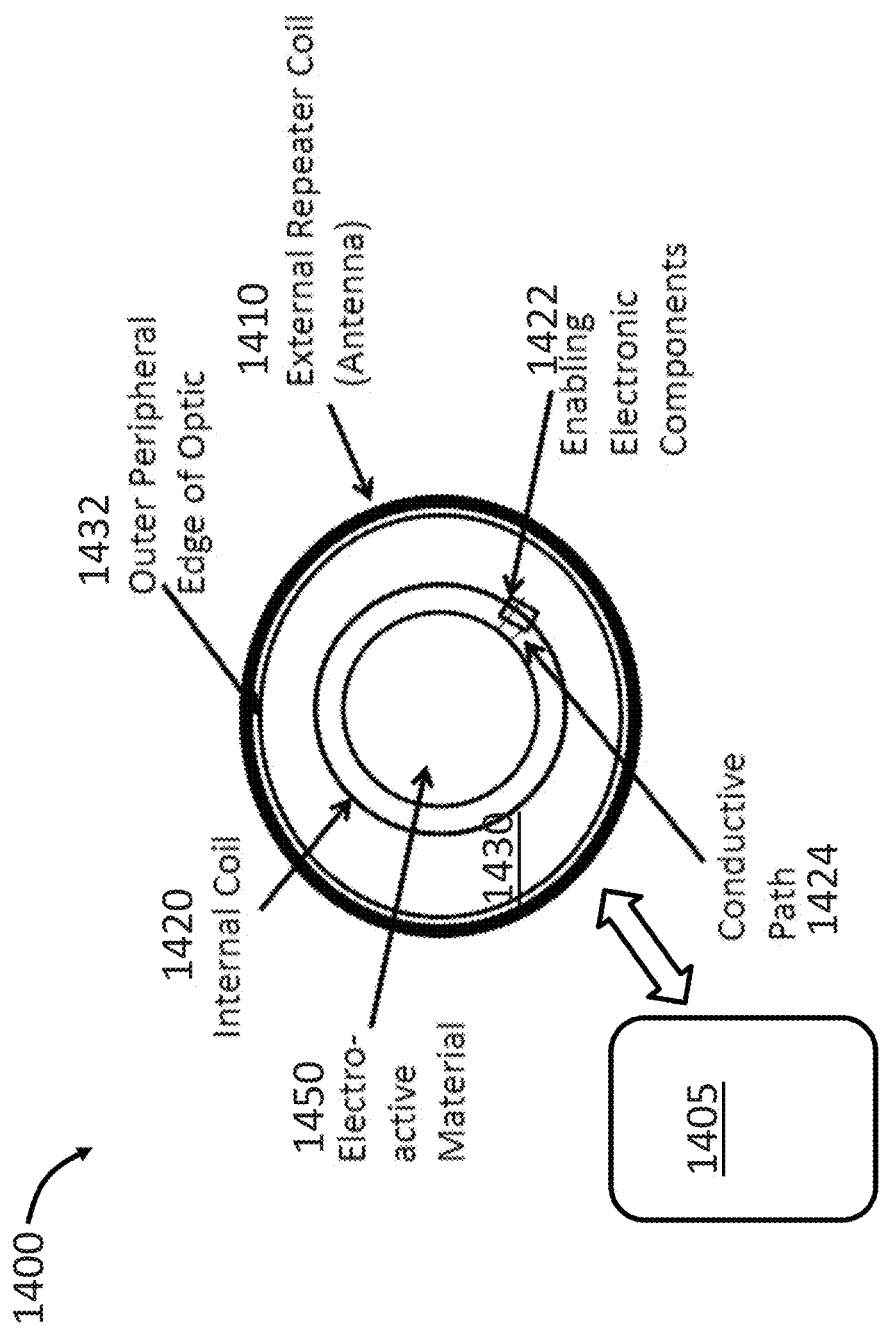
FIG. 14 shows a schematic of a 3D printed contact lens including a repeater coil and an internal coil in concentric configuration.

FIG. 14 shows a schematic of a printed ophthalmic system 1400 (e.g., a contact lens or an intra-ocular lens) including a repeater coil 1410 and an internal coil 1420 in a concentric configuration. The system 1400 includes a lens 1430 having an outer edge 1432. A first coil 1410 (also referred to as an external coil or repeater coil) is disposed on the outer edge 1432 of the lens 1430 to receive wireless energy from an external device 1405. The first coil 1410 can also transmit signals or data to the external device 1405 (e.g., functioning as an antenna). Within the outer edge 1432, a second coil 1420 (also referred to as an internal coil) is coupled to the lens 1430 to receive energy transmitted by the first coil 1410. The first coil 1410 and the second coil 1420 are substantially concentric with each other to increase the efficiency of energy transfer between the two coils 1410 and 1420.

The system 1400 also includes an electro-active element 1450 with electro-active material at the center of the lens 1430. The electro-active element 1450 is powered by the second coil 1420 via a conductive path 1424 and an internal electronic 1422, which can include, for example, a voltage controller, frequency modulator and/or demodulator, and/or any other electronics.

The electro-active element 1450 can be embedded within the lens 1430 or disposed on the front or back surface of the lens 1430. The electro-active element 1450 may include a liquid crystal layer disposed between two transparent electrodes. The liquid crystal can be embedded within the lens 1430 and the electrodes can be disposed on respective surfaces of the lens 1430 (i.e., one electrode on the front surface and the other electrode on the back surface).

The electro-active element 1450 can be manufactured via the 3D printing technique described above with reference to FIGS. 4A-4D. The internal electronic 1422 can be connected to the electro-active element 1450 after the electro-active element 1450 is fabricated. The internal electronic 1422 can be predisposed on a substrate before the electro-active element 1450 is printed. In either case, the conductive path 1424 can be printed using conductive resin.

Figure 15D:
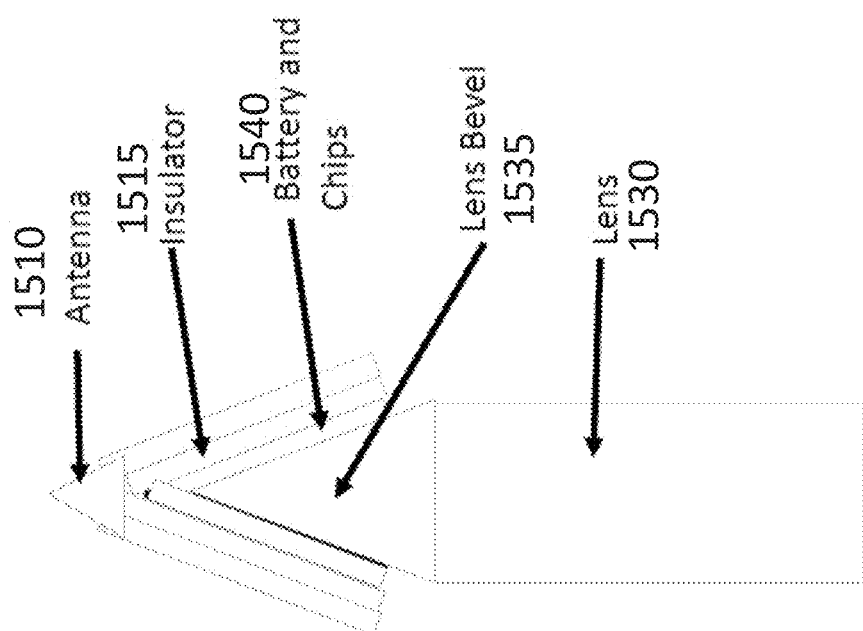

FIGS. 15A-15D illustrate a printed ophthalmic system 1500 including a coil and a battery disposed between a lens and a lens frame. FIG. 15A shows a front view of the system 1500 including a lens 1530 disposed within a lens frame 1532. FIG. 15B shows a side view of the system 1500. FIG. 15C shows a magnified view of the portion of the system 1500. The magnified view shows that a first coil 1510 (also referred to as an antenna), which is part of a repeater, disposed between the lens 1530 and the lens frame 1532.

FIG. 15D shows a further magnified view of the printed ophthalmic system 1500. This view shows that the lens 1530 has a beveled portion 1535 with a wedge shape. A battery 1540 (or any other energy storage element) is disposed on the wedge surface of the lens bevel 1535. An insulating layer 1515 is disposed on the battery 1540. The first coil 1510 is disposed substantially at the tip of the wedge surface of the beveled portion 1535 and above the insulating layer 1515, which insulates the first coil 1510 from the battery 1540.

The system 1500 integrates the first coil 1510 and the battery 1540 into the space between the lens 1530 and the lens frame 1532. This can securely fix the first coil 1510 and the battery 1540 into the system 1500 without using any area on the lens 1530, thereby reducing interference with the vision of the wearer.

To manufacture the system 1500, the lens 1530 can be printed first, followed by the coil 1510. The lens 1530 can provide mechanical support for the coil 1510 during printing. The lens frame 1532 is then printed over the coil 1510. Alternatively, the lens frame 1532 can be printed first, followed by printing the coil 1510 around the inner side of the lens frame 1532. The lens 1530 is then printed within the boundary defined by the lens frame 1532. In some examples, the battery 1540 can also be printed.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of making electronic eyewear, the method comprising:
   arranging a power supply and an electronic module in a temple printing area;
   arranging at least two electrical connectors in a frame front printing area;
   depositing droplets of lens frame material in the temple printing area and in the frame front printing area;
   curing the droplets of lens frame material to form a temple with the power supply and the electronic module embedded therein and to form a frame front with the at least two electrical connectors embedded therein;
   forming an optic by additively printing optic material around electronic circuitry in or on a first optical segment having a curved outer surface, the electronic circuitry having conductive components to electrically couple with the at least two electrical connectors;
   mechanically coupling the optic to the frame front so that the conductive components in the optic are in electrical contact with the at least two electrical connectors; and
   mechanically coupling the frame front to the temple so that the at least two electrical connectors are in electrical contact with the power supply and the electronic module, wherein forming the optic comprises:
   depositing a first layer of droplets of optic material on a first side of the electronic circuitry;

curing the first layer of droplets of optic material to form the first optical segment;

flipping over the first optical segment to expose a second side of the electronic circuitry;

depositing a second layer of droplets of optic material on the second side of the electronic circuitry; and curing the second layer of droplets of optic material to form a second optical segment, the first optical segment and the second optical segment encapsulating the electronic circuitry.

2. The method of claim 1, wherein forming the optic comprises:

after depositing the first layer of droplets of optic material on the first side of the electronic circuitry, disposing a first electrode on the first side of the electronic circuitry; and after depositing the second layer of droplets of optic material on the second side of the electronic circuitry, disposing a second electrode on the second side of the electronic circuitry.

3. The method of claim 2, further comprising:

printing at least one interconnect comprising conductive resin on the electronic circuitry to electrically couple the electronic circuitry to the second electrode on the second side of the electronic circuitry.

4. The method of claim 1, wherein forming the optic comprises forming at least a portion of at least one of a refractive lens or a Fresnel lens.

5. The method of claim 1, wherein the electronic circuitry comprises an electro-active element configured to provide at least one of a variable optical power or a variable tint.

6. A method of making electronic eyewear, arranging a power supply and an electronic module in a temple printing area;

arranging at least two electrical connectors in a frame front printing area;

depositing droplets of lens frame material in the temple printing area and in the frame front printing area;

curing the droplets of lens frame material to form a temple with the power supply and the electronic module embedded therein and to form a frame front with the at least two electrical connectors embedded therein;

forming an optic by additively printing optic material around electronic circuitry in or on a first optical segment having a curved outer surface, the electronic circuitry having conductive components to electrically couple with the at least two electrical connectors;

mechanically coupling the optic to the frame front so that the conductive components in the optic are in electrical contact with the at least two electrical connectors; and mechanically coupling the frame front to the temple so that the at least two electrical connectors are in electrical contact with the power supply and the electronic module, wherein forming the optic comprises:

forming the first optical segment by depositing optic material in a depression or dimple in a substrate so as to form the curved outer surface facing down;

curing the optic material to form a receptacle or planar surface facing up; and disposing the electronic circuitry on the receptacle or planar surface.

7. The method of claim 1, wherein the curved outer surface is convex.

8. The method of claim 1, wherein the curved outer surface is concave.

9. The method of claim 1, wherein the curved outer surface is a first curved outer surface having a first non-zero radius of curvature and wherein additively printing the optic material around the electronic circuitry comprises forming a second curved outer surface having a second non-zero radius of curvature different than the first non-zero radius of curvature.

10. The method of claim 9, wherein one of the first curved outer surface or the second curved outer surface is concave and the other of the first curved outer surface or second curved outer surface is convex.

11. The method of claim 1, wherein forming the optic comprises:

disposing a protective layer on the electronic circuitry before additively printing the optic material around the electronic circuitry.

12. The method of claim 1, wherein the electronic circuitry is first electronic circuitry and forming the optic further comprises:

disposing second electronic circuitry on the optic material additively printed around the first electronic circuitry; and additively printing additional optic material around the second electronic circuitry.

13. The method of claim 6, wherein the curved outer surface is convex.

14. The method of claim 6, wherein the curved outer surface is concave.

15. The method of claim 6, wherein the curved outer surface is a first curved outer surface having a first non-zero radius of curvature and wherein additively printing the optic material around the electronic circuitry comprises forming a second curved outer surface having a second non-zero radius of curvature different than the first non-zero radius of curvature.

16. The method of claim 15, wherein one of the first curved outer surface or the second curved outer surface is concave and the other of the first curved outer surface or second curved outer surface is convex.

17. The method of claim 6, wherein forming the optic comprises:

disposing a protective layer on the electronic circuitry before additively printing the optic material around the electronic circuitry.

* * * * *